US012191594B2

(12) United States Patent
Goren

(10) Patent No.: US 12,191,594 B2
(45) Date of Patent: Jan. 7, 2025

(54) QUICK INSTALL PLUGGABLE TERMINAL BLOCK

(71) Applicant: Richard Goren Enterprises, LLC, Fishers, IN (US)

(72) Inventor: Richard H. Goren, Fishers, IN (US)

(73) Assignee: Speaker Snap LLC, Fishers, IN (US)

( * ) Notice: Subject to any disclaimer, the term of this patent is extended or adjusted under 35 U.S.C. 154(b) by 0 days.

(21) Appl. No.: 18/432,266

(22) Filed: Feb. 5, 2024

(65) Prior Publication Data

US 2024/0178599 A1 May 30, 2024

Related U.S. Application Data

(63) Continuation of application No. 18/364,132, filed on Aug. 2, 2023, now Pat. No. 11,894,630, which is a continuation-in-part of application No. PCT/US2022/077738, filed on Oct. 7, 2022, which is a continuation of application No. 17/935,359, filed on Sep. 26, 2022, now Pat. No. 11,749,927, said application No. 18/364,132 is a continuation-in-part of application No. 17/935,359, filed on Sep. 26, 2022, now Pat. No. 11,749,927.

(60) Provisional application No. 63/268,825, filed on Mar. 3, 2022.

(51) Int. Cl.

*H01R 4/00* (2006.01)
*H01R 13/24* (2006.01)
*H01R 101/00* (2006.01)

(52) U.S. Cl.

CPC ..... *H01R 13/2457* (2013.01); *H01R 13/2471* (2013.01); *H01R 2101/00* (2013.01); *H01R 2201/16* (2013.01)

(58) Field of Classification Search

CPC ................ H01R 4/2433; H01R 4/2404; H01R 4/2412; H01R 4/40; H01R 2103/00; H01R 4/2491; H01R 4/4845

See application file for complete search history.

(56) References Cited

U.S. PATENT DOCUMENTS 4,468,083 A 8/1984 Lee et al.
4,824,405 A 4/1989 Derain
5,786,779 A * 7/1998 Chun .................. H03M 7/3022 341/61
5,915,991 A * 6/1999 Roman ................ H01R 4/4821 439/441
6,261,120 B1 7/2001 Beege et al.
6,447,333 B1 9/2002 Springer (Continued)

FOREIGN PATENT DOCUMENTS

KR 200434573 Y1 12/2006

*Primary Examiner* — Phuong Chi Thi Nguyen

(74) *Attorney, Agent, or Firm* — Woodard, Emhardt, Henry, Reeves & Wagner, LLP

(57) ABSTRACT

A terminal block including a body, a plug, and a lever. The plug extends from the body to connect to an outlet. As the plug connects to an outlet, the plug is configured to receive an electrical pin and/or another conductor. In one example, the outlet and pin are part of an audio device. The body is configured to receive a wire and/or another conductor. The lever is configured to actuate between an open position and a closed position. In the open position, the lever is configured to compress an internal spring to receive a wire. In the closed position, the lever is configured to release the spring such as to retain the wire.

20 Claims, 29 Drawing Sheets

(56) References Cited

U.S. PATENT DOCUMENTS

| | | | | |
|---|---|---|---|---|
| 6,786,779 | B2 | 9/2004 | Feldmeier et al. | |
| 6,851,967 | B2 | 2/2005 | Miyoshi et al. | |
| 6,893,286 | B2 | 5/2005 | Drewes et al. | |
| 7,083,463 | B2 * | 8/2006 | Steinkemper ........ | H01R 4/4846 439/441 |
| 7,238,043 | B2 * | 7/2007 | Reibke ................. | H01R 4/4821 439/441 |
| 10,014,596 | B2 | 7/2018 | Hartmann | |
| 11,024,987 | B2 | 6/2021 | Koellmann et al. | |
| 11,043,759 | B2 | 6/2021 | Ober-Woerder | |
| 2003/0073356 | A1 | 4/2003 | Victor | |
| 2003/0124916 | A1 | 7/2003 | Mano et al. | |
| 2006/0063420 | A1 | 3/2006 | Reibke et al. | |
| 2021/0143560 | A1 | 5/2021 | Koellmann | |

* cited by examiner

QUICK INSTALL PLUGGABLE TERMINAL BLOCK

CROSS REFERENCE TO RELATED APPLICATIONS

This application is a continuation of U.S. patent application Ser. No. 18/364,132, filed Aug. 2, 2023, which is hereby incorporated by reference. U.S. patent application Ser. No. 18/364,132, filed Aug. 2, 2023, is a continuation-in-part of International Patent Application Number PCT/US2022/077738, filed Oct. 7, 2022, which are hereby incorporated by reference. U.S. patent application Ser. No. 18/364,132, filed Aug. 2, 2023, is a continuation-in-part of U.S. patent application Ser. No. 17/935,359, filed Sep. 26, 2022, which are hereby incorporated by reference. International Patent Application Number PCT/US2022/077738, filed Oct. 7, 2022, is a continuation of U.S. patent application Ser. No. 17/935,359, filed Sep. 26, 2022, which are hereby incorporated by reference. International Patent Application Number PCT/US2022/077738, filed Oct. 7, 2022, claims the benefit of U.S. Patent Application No. 63/268,825, filed Mar. 3, 2022, which are hereby incorporated by reference. U.S. patent application Ser. No. 17/935,359, filed Sep. 26, 2022, claims the benefit of U.S. Patent Application No. 63/268,825, filed Mar. 3, 2022, which are hereby incorporated by reference.

BACKGROUND

Terminal blocks can be used to electrically connect various electrical conductors and components. For example, a user can use a terminal block to couple multiple cables and/or devices to carry an audio signal, transfer power, transmit data, and/or for other purposes. With some terminals, the electrical and mechanical coupling between wires and/or other types of conductors is incomplete and/or unreliable. Such connections can cause interruptions in electrical signals, inconsistent power transfer, sparks between electrical conductors, and/or increases in electrical impedance among other effects.

Thus, there is a need for improvement in this field.

SUMMARY

Terminal blocks are often used to connect audio/visual (AV) systems. Sometimes pluggable style terminal blocks, such as Phoenix connectors or Euroblocks, are specifically used to connect speaker wires to sound systems, such as audio amplifiers, or other electronic devices. Many Euroblocks and other terminal blocks require a user to unscrew a housing, insert the wire, tighten a set screw to secure the wire, and then screw back on the housing. As should be appreciated, the process is time-consuming and difficult. In some instances, the process does not ensure that the wire is fully secured which can allow the wire to disconnect from the terminal block among other complications. This can be a significant issue when setting up and breaking down sound equipment at concerts and in studios.

A unique pluggable terminal block has been developed to enable quick and secure electrical connections. In one example, the terminal block is generally in a form similar to a Euroblock or Phoenix connector, but instead of having a screw to clamp the wires, the pluggable terminal block includes a lever mechanism that is able to quickly secure to and disengage from the wires. In one variation, the pluggable terminal block includes a body configured to retain and secure a wire. Attached to the body, the terminal block further includes a plug configured to couple to an outlet or socket. The plug is configured to retain electrical pins in the outlet. In one embodiment, the body and the plug are integrally formed as a single part. The body further includes a lever configured to actuate an internal spring. In one example, the spring is made from aluminum. In another example, the spring is made from stainless steel, but it should be appreciated that the spring can be made from other electrically conductive materials. The lever generally moves the spring from an open position configured to receive a wire to a closed position configured to retain the wire. In one example, the spring includes an aperture configured to receive the wire when the lever is in the open position. The aperture is further configured to surround and retain the wire when the lever is in the second position. The spring aperture is sized to receive wires ranging in size from 12-24 American wire gauge (AWG). In another example, the lever is perpendicular to the body of the terminal block in the open position and is parallel to the body of the terminal block in the closed position. In the open position, the lever applies a compression force to the spring. Generally, the compression force moves the spring aperture vertically (e.g. downward). Thus, the spring aperture is exposed and able to receive the wire. In the closed position, the lever is not in contact with the spring.

The pluggable terminal block further includes a busbar configured to transfer electricity between conductors at either end of the terminal block. For example, the wire transfers electricity into the terminal block, along the busbar, and into a device. In one example, the busbar is made from a highly conductive material, such as copper, aluminum, silver, and/or gold. In another example, the busbar is plated with a conductive material (e.g., gold plated). In one embodiment, the busbar extends through the aperture of the spring. For example, the busbar and the spring aperture are configured to form a sandwich arrangement with the wire. As should be appreciated, this arrangement clamps the wire between the spring and the busbar in a secure connection.

Within the plug, the busbar includes a socket that is configured to receive pins from the outlet. The socket includes two leaves that extend toward the outlet and define a pin opening. The leaves then transition into arches which curve inward towards each other. By curving towards each other, the arches are configured to contact and electrically connect to the pin when the pin is inserted into the pin opening of the socket. The arches further apply a compressive force to the pin to limit movement of the pin and to maintain the electrical connection. The arches then transition into lips that curve outward and define a mouth. By curving outward, the lips and arches allow a pin to separate the arches and move into the pin opening between the leaves. The terminal block further includes one or more clips that are configured to mechanically couple the terminal block to a ridge on the outlet. As should be appreciated, the socket allows a user to establish a secure electrical connection by simply pushing the terminal block into the outlet.

In one embodiment, the pluggable terminal block includes two busbars, two springs, and two levers. The pluggable terminal block further includes a divider between the busbars to electrically isolate the busbars and support two independent conduction paths. In another embodiment, the terminal block includes three busbars and two dividers to support three separate conduction paths. In yet another embodiment, the terminal block includes four busbars and three dividers to support four separate conduction paths. In a further embodiment, the terminal block includes five busbars and four dividers to support five separate conduction paths. In yet another embodiment, the terminal block includes six busbars and five dividers to support six separate conduction paths. As should be appreciated, the various embodiments of the terminal block include the same spring and lever mechanism for each conduction path. Further, the terminal block could be expanded to support any number of conduction paths.

In another embodiment, the pluggable terminal block is configured to couple to one or more other pluggable terminal blocks to form a terminal block assembly. In one example, the pluggable terminal blocks include ribs and/or slots. The slots are configured to retain the ribs. When two pluggable terminal blocks couple together, ribs on one pluggable terminal block slide into slots on the other pluggable terminal block such as to prevent the pluggable terminal blocks from moving in a lateral direction relative to one another. In one example, the pluggable terminal blocks further include studs and/or divots. When the pluggable terminal blocks are coupled together, the divots are configured to retain the studs such as to limit movement of the terminal blocks relative to one another. By coupling multiple pluggable terminal blocks, a user can construct a terminal block assembly with a desired amount of electrical conduction paths. For example, a user can couple a pluggable terminal block that supports two conduction paths and a pluggable terminal block that supports three conduction paths. The resulting terminal block assembly therefore supports five conduction paths. As should be appreciated, the terminal block assembly can couple to an outlet in the same way as a single pluggable terminal block of the same size. Further, any number of pluggable terminal blocks could be coupled to support any number of conduction paths.

In an example use case, a user begins by rotating the lever into the open position. As mentioned above, the lever applies force to the spring in the open position, thus exposing the spring aperture. The user then inserts the wire into the spring aperture via a wire opening in the body. Once the wire is within the spring aperture, the user rotates the lever into the closed position. As mentioned above, the lever does not apply force to the spring in the closed position, thus the spring aperture moves vertically upward, sandwiching the wire between the spring aperture and the busbar. As should be appreciated, the wire and busbar are electrically connected once the wire is in contact with the busbar. To remove the terminal block from the wire, the user rotates the lever into the open position and pulls the wire out of the spring aperture.

In another example case, the user can insert the plug into the outlet. As the user inserts the plug, the pin of the outlet contacts the socket of the busbar. The arches of the socket compress the pin to maintain contact and electrical connection between the pin and busbar. At the same time, the clip on the terminal block attaches to the ridge of the outlet to further strengthen the mechanical connection. To remove the terminal block from the outlet, the user lifts the clip away from the ridge and pulls the terminal block out of the outlet. In one instance, the user connects the wire to the terminal block before connecting the terminal block to the outlet. In another instance, the user connects the terminal block to the outlet and then connects the wire to the terminal block.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a terminal block.

Aspect 3 generally concerns the system of any previous aspect in which the terminal block is configured to facilitate toolless connection of a wire to the terminal block.

Aspect 4 generally concerns the system of any previous aspect in which the terminal block includes a lever configured to actuate an internal spring.

Aspect 5 generally concerns the system of any previous aspect in which the lever actuates the spring from a first position configured to receive a wire to a second position configured to retain the wire.

Aspect 6 generally concerns the system of any previous aspect in which the aperture is configured to surround and retain the wire in the second position.

Aspect 7 generally concerns the system of any previous aspect in which the spring aperture is configured to direct the wire vertically upward into contact with a busbar when in the second position.

Aspect 8 generally concerns the system of any previous aspect in which the wire is contacted on one side via the busbar in the second position.

Aspect 9 generally concerns the system of any previous aspect in which the wire is contacted on an opposite side via an edge of the spring aperture in the second position.

Aspect 10 generally concerns the system of any previous aspect in which the lever applies a compression force to the spring in the first position.

Aspect 11 generally concerns the system of any previous aspect in which the compression force is configured to compress the spring to allow access to the spring aperture in the first position.

Aspect 12 generally concerns the system of any previous aspect in which the terminal block includes a body portion defining an integral channel.

Aspect 13 generally concerns the system of any previous aspect in which the lever is configured to rest within the integral channel when in the second position to prevent accidental rotation of the lever.

Aspect 14 generally concerns the system of any previous aspect in which the spring includes an aperture configured to retain the wire within the terminal block.

Aspect 15 generally concerns the system of any previous aspect in which the aperture includes an edge configured to direct the wire vertically upward into contact with a busbar in a sandwich arrangement.

Aspect 16 generally concerns the system of any previous aspect in which the sandwich arrangement is configured to retain the wire within the terminal block.

Aspect 17 generally concerns the system of any previous aspect in which the terminal block includes a busbar configured to transfer electricity.

Aspect 18 generally concerns the system of any previous aspect in which the busbar extends through the aperture of the spring.

Aspect 19 generally concerns the system of any previous aspect in which the busbar and spring aperture are configured to form a sandwich arrangement with the wire when in the second position.

Aspect 20 generally concerns the system of any previous aspect in which the sandwich arrangement is configured to securely retain the wire in the second position.

Aspect 21 generally concerns the system of any previous aspect in which the terminal block accepts 12-24 American wire gauges (AWG) wire.

Aspect 22 generally concerns the system of any previous aspect including a plug configured to receive a pin.

Aspect 23 generally concerns the system of any previous aspect in which the busbar includes a socket configured to receive the pin.

Aspect 24 generally concerns the system of any previous aspect in which the busbar being configured to provide an electrical connection between the wire and the pin.

Aspect 25 generally concerns the system of any previous aspect in which the spring having an open position configured to receive the wire and a closed position configured to clamp the wire to the busbar.

Aspect 26 generally concerns the system of any previous aspect in which the spring is biased to the closed position.

Aspect 27 generally concerns the system of any previous aspect in which the lever configured to actuate the spring to the opened position.

Aspect 28 generally concerns the system of any previous aspect including the body.

Aspect 31 generally concerns the system of any previous aspect including the spring.

Aspect 32 generally concerns the system of any previous aspect in which the spring including a base, an arm facing the base, and a fulcrum where the spring bends to connect the base to the arm.

Aspect 33 generally concerns the system of any previous aspect in which the base of the spring presses against the busbar.

Aspect 34 generally concerns the system of any previous aspect in which the spring having an arm that bends towards the base.

Aspect 35 generally concerns the system of any previous aspect in which the arm defining an aperture with an edge configured to clamp the wire against the busbar.

Aspect 36 generally concerns the system of any previous aspect in which the busbar has a guide that extends through the aperture in the arm of the spring.

Aspect 37 generally concerns the system of any previous aspect in which the spring having an open position where the edge of the aperture is spaced away from the busbar to form a gap to receive the wire.

Aspect 38 generally concerns the system of any previous aspect in which the spring having a closed position wherein the edge of the aperture clamps the wire against the guide of the busbar to retain the wire.

Aspect 39 generally concerns the system of any previous aspect including the lever.

Aspect 40 generally concerns the system of any previous aspect including the lever pivotally coupled to the body.

Aspect 41 generally concerns the system of any previous aspect in which the lever being configured to pivot to press the arm towards the base by bending the spring at the fulcrum to move the spring to the open position to receive the wire.

Aspect 42 generally concerns the system of any previous aspect in which the lever being configured to release the arm to allow spring to spring back to the closed position.

Aspect 44 generally concerns the system of any previous aspect in which the busbar including a socket on an opposite side from the spring.

Aspect 45 generally concerns the system of any previous aspect in which the spring is attached to the busbar.

Aspect 46 generally concerns the system of any previous aspect in which the fulcrum of the spring is positioned proximal to the flange of the busbar where the pin is attached.

Aspect 47 generally concerns the system of any previous aspect in which the lever having a lobe configured to press the arm toward the base of the spring when the lever is pivoted.

Aspect 48 generally concerns the system of any previous aspect in which the lever is configured to actuate the spring.

Aspect 49 generally concerns the system of any previous aspect in which the spring defining an aperture configured to retain a wire within the terminal block.

Aspect 50 generally concerns the system of any previous aspect in which the aperture includes an edge configured to press the wire into contact with the busbar in a sandwich arrangement.

Aspect 51 generally concerns the system of any previous aspect including the busbar.

Aspect 52 generally concerns the system of any previous aspect in which the busbar integrally connected to the spring.

Aspect 53 generally concerns the system of any previous aspect in which the socket is configured to receive a pin.

Aspect 54 generally concerns the system of any previous aspect in which the body defines a channel.

Aspect 55 generally concerns the system of any previous aspect in which the lever is configured to rest within the channel to prevent accidental rotation of the lever.

Aspect 56 generally concerns the system of any previous aspect in which the busbar is integrally connected to the spring.

Aspect 57 generally concerns the system of any previous aspect in which the edge of the aperture in the spring is positioned on a side of the wire that is opposite to the busbar when in the closed position.

Aspect 58 generally concerns the system of any previous aspect in which the lever rests within the channel when the spring is in the closed position.

Aspect 59 generally concerns the system of any previous aspect in which the lever is configured to extend out of the channel when pivoted to compress the spring to the open position.

Aspect 60 generally concerns the system of any previous aspect including the plug.

Aspect 61 generally concerns the system of any previous aspect in which the plug is integrally formed with the body.

Aspect 62 generally concerns the system of any previous aspect in which the plug is configured to couple to an outlet.

Aspect 63 generally concerns the system of any previous aspect in which the plug is configured to receive a pin when coupled to an outlet.

Aspect 64 generally concerns the system of any previous aspect in which the busbar positioned within the body and the plug.

Aspect 65 generally concerns the system of any previous aspect including the busbar including a strut and a socket.

Aspect 66 generally concerns the system of any previous aspect including the strut.

Aspect 67 generally concerns the system of any previous aspect including the socket.

Aspect 68 generally concerns the system of any previous aspect in which the socket defines a pin opening.

Aspect 69 generally concerns the system of any previous aspect in which the socket includes leaves.

Aspect 70 generally concerns the system of any previous aspect in which the socket includes a panel.

Aspect 71 generally concerns the method of any previous aspect including leaves extending from opposite sides of the panel.

Aspect 72 generally concerns the system of any previous aspect including the arches.

Aspect 73 generally concerns the system of any previous aspect including the lips.

Aspect 74 generally concerns the system of any previous aspect in which the leaves curve toward each other to form arches.

Aspect 75 generally concerns the system of any previous aspect in which the arches curve away from each other to form lips.

Aspect 76 generally concerns the system of any previous aspect in which the arches are configured to contact a pin.

Aspect 77 generally concerns the system of any previous aspect in which the arches are configured to compress a pin between each other.

Aspect 78 generally concerns the system of any previous aspect in which the lips define a mouth that is configured to receive a pin.

Aspect 79 generally concerns the system of any previous aspect in which the arches are configured to spread apart when a pin moves into the mouth toward the pin opening.

Aspect 80 generally concerns the system of any previous aspect in which the leaves define a pin opening between each other.

Aspect 81 generally concerns the system of any previous aspect in which the socket is configured to retain a pin in the pin opening to maintain an electrical connection.

Aspect 82 generally concerns the system of any previous aspect including a separator.

Aspect 83 generally concerns the system of any previous aspect including the separator positioned in the body and plug.

Aspect 84 generally concerns the system of any previous aspect in which the terminal block includes more than one busbar.

Aspect 85 generally concerns the system of any previous aspect in which the separator being positioned between two busbars.

Aspect 86 generally concerns the system of any previous aspect in which the separator is configured to electrically isolate two busbars.

Aspect 87 generally concerns the system of any previous aspect in which the terminal block includes three busbars.

Aspect 88 generally concerns the system of any previous aspect in which the terminal block includes two separators positioned to isolate three busbars.

Aspect 89 generally concerns the system of any previous aspect in which the terminal block includes four busbars.

Aspect 90 generally concerns the system of any previous aspect in which the terminal block includes three separators positioned to isolate four busbars.

Aspect 91 generally concerns the system of any previous aspect in which the terminal block includes five busbars.

Aspect 92 generally concerns the system of any previous aspect in which the terminal block includes four separators positioned to isolate five busbars.

Aspect 93 generally concerns the system of any previous aspect in which the terminal block includes six busbars.

Aspect 94 generally concerns the system of any previous aspect in which the terminal block includes five separators positioned to isolate six busbars.

Aspect 95 generally concerns the system of any previous aspect in which the separator is integrally formed with the body.

Aspect 96 generally concerns the system of any previous aspect in which each terminal block includes a lever and a spring for each busbar.

Aspect 97 generally concerns the system of any previous aspect including the clip configured to couple to an outlet when the plug is positioned in the outlet.

Aspect 98 generally concerns the system of any previous aspect including the spring configured to selectively couple a wire to the busbar.

Aspect 99 generally concerns the system of any previous aspect in which the plug and body are separate parts that are attached to each other.

Aspect 100 generally concerns the system of any previous aspect in which the strut is configured to contact a wire.

Aspect 101 generally concerns the system of any previous aspect including an intermediate portion connecting the strut and the socket.

Aspect 102 generally concerns the system of any previous aspect in which the intermediate portion is arched.

Aspect 103 generally concerns the system of any previous aspect in which the busbar is formed from a single piece of material.

Aspect 104 generally concerns the system of any previous aspect in which the busbar is formed by cutting and bending a single piece of material.

Aspect 105 generally concerns the system of any previous aspect in which the number of separators is one less than the number of busbars.

Aspect 106 generally concerns the system of any previous aspect in which the spring includes an aperture configured to receive the wire in the first position.

Aspect 107 generally concerns the system of any previous aspect in which the busbar is configured to connect conductors on a separate conduction path.

Aspect 108 generally concerns the system of any previous aspect in which the terminal block is configured to facilitate toolless connection of the pin and the outlet.

Aspect 109 generally concerns the system of any previous aspect in which the leaf extends in a parallel direction to the other leaf.

Aspect 110 generally concerns the system of any previous aspect in which the busbar includes a strut positioned near the spring.

Aspect 111 generally concerns the system of any previous aspect in which the busbar includes an intermediate portion.

Aspect 112 generally concerns the system of any previous aspect in which the socket is configured to receive a pin with a width between 0.5 and 2.5 millimeters.

Aspect 113 generally concerns the system of any previous aspect in which the busbars are aligned in a row with one separator positioned between every two busbars.

Aspect 114 generally concerns the system of any previous aspect in which the terminal block is a pluggable type terminal block.

Aspect 115 generally concerns the system of any previous aspect in which the terminal block is in a form of a Euroblock.

Aspect 116 generally concerns the system of any previous aspect in which the socket configured to receive a Euroblock.

Aspect 117 generally concerns the system of any previous aspect in which the outlet configured to receive the terminal block in a pluggable manner.

Aspect 118 generally concerns the system of any previous aspect in which the terminal block is configured to couple to another terminal block.

Aspect 119 generally concerns the system of any previous aspect in which the terminal blocks are configured to couple using a dovetail joint.

Aspect 120 generally concerns the system of any previous aspect in which the terminal block defines a slot.

Aspect 121 generally concerns the system of any previous aspect in which the terminal block includes a rib.

Aspect 122 generally concerns the system of any previous aspect in which the terminal block includes a rib and a slot.

Aspect 123 generally concerns the system of any previous aspect in which the terminal block defines a divot.

Aspect 124 generally concerns the system of any previous aspect in which the terminal block includes a stud.

Aspect 125 generally concerns the system of any previous aspect in which the slot is configured to receive the rib.

Aspect 126 generally concerns the system of any previous aspect in which the rib is wider on a distal end than on a proximal end.

Aspect 127 generally concerns the system of any previous aspect in which the slot extends through one side of the terminal block.

Aspect 128 generally concerns the system of any previous aspect in which the rib is configured to slide into the slot from one side of the terminal block.

Aspect 129 generally concerns the system of any previous aspect in which the slot extends through a bottom side of the terminal block.

Aspect 130 generally concerns the system of any previous aspect in which the divot is configured to receive the stud.

Aspect 131 generally concerns the system of any previous aspect in which the divot and stud are configured to impede terminal blocks from sliding relative to one another.

Aspect 132 generally concerns the system of any previous aspect in which the divot of one terminal block is configured to receive the stud of another terminal block.

Aspect 133 generally concerns the system of any previous aspect in which the terminal block is configured to couple to another terminal block using a dovetail joint.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
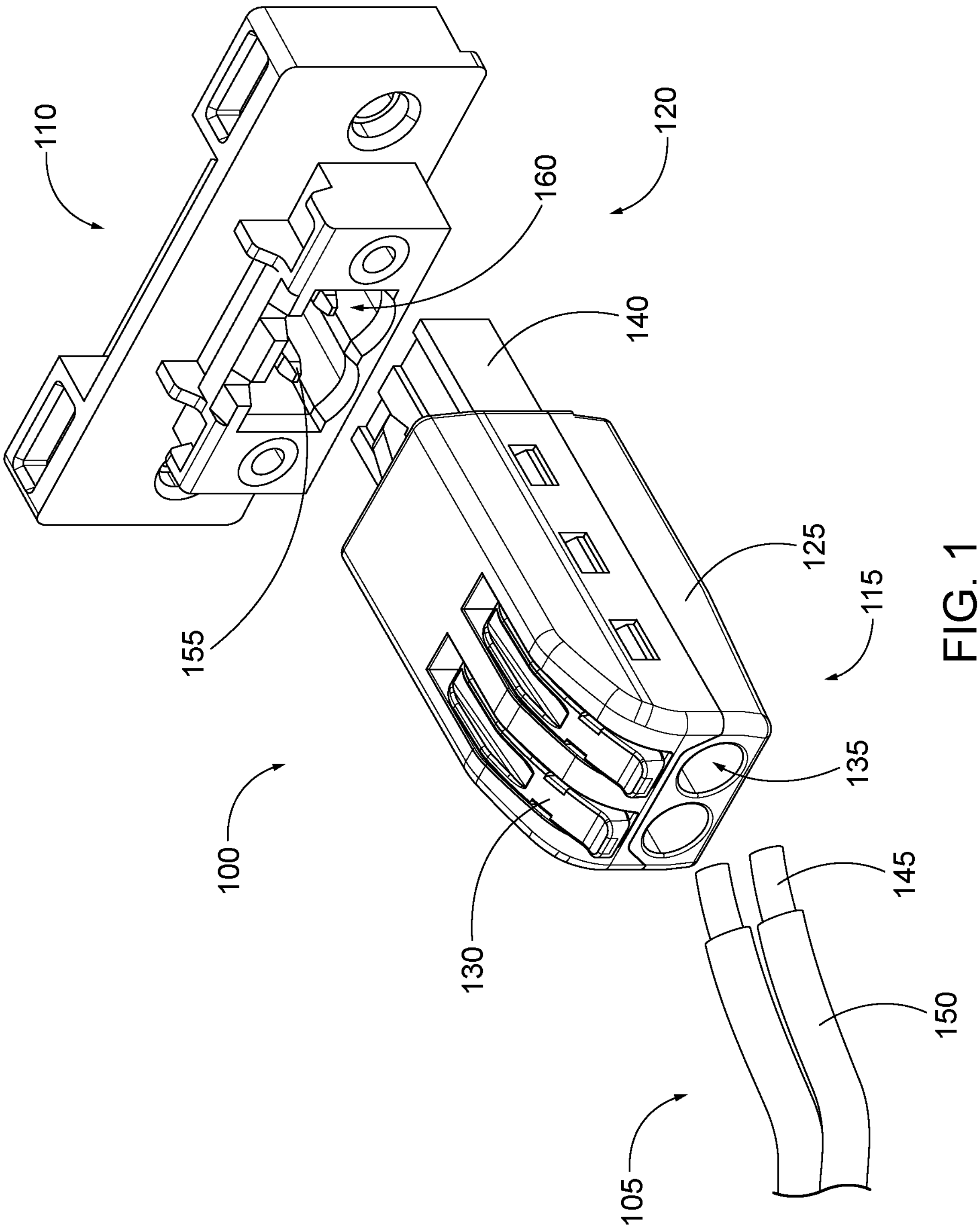
FIG. 1 is a perspective view of a pluggable terminal block, wires, and an outlet.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 2:
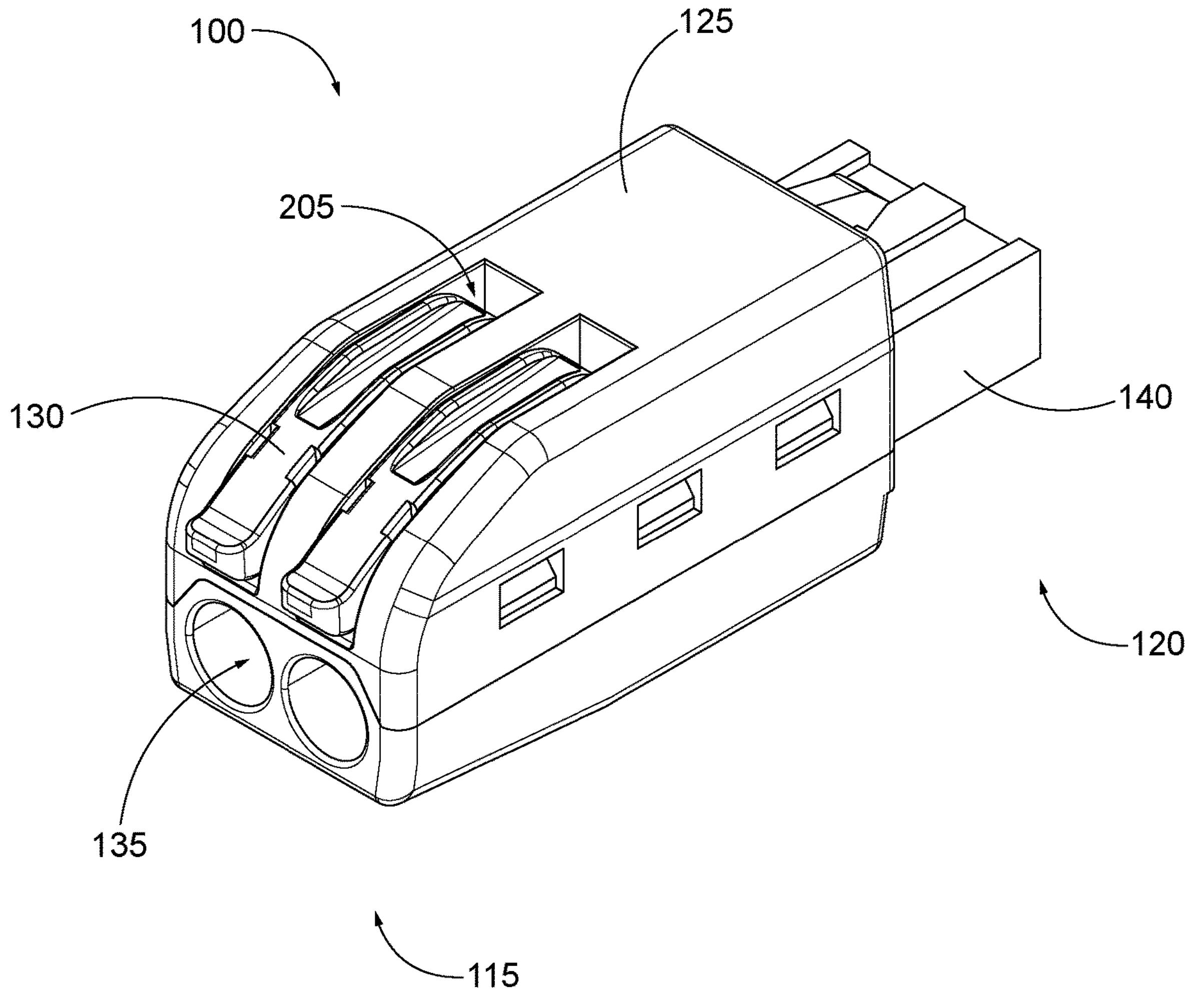
FIG. 2 is a perspective view of the FIG. 1 terminal block on a wire side.

Referring to FIG. 1, a pluggable terminal block 100 is generally configured to couple to wires 105 and to an outlet 110. In the illustrated example, the pluggable terminal block 100 is generally in the form of a Euroblock or Phoenix connector that can be used to connect wires to various audio equipment, such as microphones and amplifiers, and other types of electronic equipment. Unlike traditional pluggable terminal blocks that require screws to secure the wires, the pluggable terminal block 100 in FIG. 1 facilitates manual or toolless connection of the wire 105 to the terminal block 100 without the need for additional tools like screwdrivers. Further, the pluggable terminal block 100 allows a user to quickly remove and replace the wires 105. In one example, the wire 105 includes speaker wire and the outlet 110 is positioned on an audio device, such as a stereo system. In another example, the outlet 110 can electrically connect the terminal block 100 and wire 105 to additional wiring in a wall and/or enclosure. In yet another example, the terminal block 100 can be used to connect other types of wires 105 and outlets 110 for lighting devices, for devices in a vehicle, and/or for other purposes. As shown, the terminal block 100 is configured to connect to one or more wires 105 on a wire side 115. Similarly, the terminal block 100 is configured to connect to the outlet 110 on an outlet side 120. As should be appreciated, the pluggable terminal block 100 can be electrically connected to various types of wires, electrical pins, and/or other electrical conductors on the wire side 115 and/or outlet side 120.

Referring to FIGS. 1, 2, 3, 4, 5, and 6, the pluggable terminal block 100 includes a body 125 and a lever 130. The body 125 is configured to enclose internal components of the terminal block 100 and generally forms the structure of the terminal block 100. In the illustrated embodiment, the body 125 is generally rectangular in shape. In another embodiment, the body 125 can be shaped differently, such as cylindrically or trapezoidally shaped. The body 125 is made of a rigid material, such as a plastic or metallic material. In one embodiment, the body 125 is made of a material that is not electrically conductive. The body 125 can be made of a single piece of material or from multiple pieces that are joined together. For example, the body 125 can be formed from multiple pieces that couple together through one or more clips.

The lever 130 is rotatably coupled to the body 125. The lever 130 is operable such that rotating the lever 130 in one direction opens a space for the wire 105 and/or another electrical conductor to be positioned within the terminal block 100. Subsequently rotating the lever 130 in an opposite direction closes the space such as to secure the wire 105 in place within the terminal block 100. Through the lever 130, a user can reliably couple the wire 105 to the terminal block 100 without needing tools and/or other devices. The terminal block 100 allows a user to establish a quick and reliable electrical connection between various devices through the lever 130 and outlet 110. Each lever 130 is configured to selectively couple a conductor to a separate conduction path within the terminal block 100. In the illustrated example, the terminal block 100 is configured to connect pairs of electrical conductors along two conduction paths. In other embodiments, the terminal block 100 is configured to connect conductors along another number of paths, such as one, five, or an amount greater than five.

The body 125 defines wire openings 135 on the wire side 115. The wire openings 135 are configured to provide space for the wires 105 within the terminal block 100. The lever 130 is configured to selectively couple the terminal block 100 to the wire 105 when the wire 105 is positioned within the wire opening 135. In one example, the wire opening 135 is configured to receive the wire 105 as large as 0 American Wire Gauge (AWG). In another example, the plug opening 310 can receive wire 105 as small as 24 AWG. In yet another example, the wire opening 135 is configured to receive the wire 105 between 12 and 24 AWG. The body 125 further defines a channel 205 for each lever 130. The channels 205 are configured to provide space for lever 130 in the shown arrangement.

The terminal block 100 includes a plug 140 positioned toward the outlet side 120. The plug 140 is configured to mechanically couple to the outlet 110. In one example, the plug 140 supports the terminal block 100 by mechanically coupling to the outlet 110. In one embodiment, the plug 140 is integrally formed from the same piece of material as the body 125. In another embodiment, the plug 140 is formed from a separate piece of material and is mechanically coupled to the body 125 through adhesive, clips, fasteners, and/or by the shapes of the body 125 and plug 140. Further, the plug 140 is made of a rigid material. In one example, the plug 140 is made from an electrically non-conductive material, such as plastic.

Each wire 105 includes a conductive portion 145 and an insulated portion 150. The conductive portion 145 is made of an electrically conductive material, such as copper and/or aluminum. The conductive portion 145 is configured to contact and electrically connect to the interior of the terminal block 100. The insulated portion 150 surrounds a portion of the conductive portion 145 and is made of an insulative material. The insulated portion 150 prevents unintended contact and electrical connections with the conductive portion 145 of the wire 105. In an alternate embodiment, the wire 105 does not include the insulated portion 150.

The outlet 110 generally includes one or more pins 155. The pin 155 is made of an electrically conductive material, such as copper and/or aluminum. In one example, the pin 155 is gold-plated. The pin 155 is configured to contact and electrically connect to the interior of the terminal block 100. In one embodiment, the pin 155 is electrically connected to a circuit on one side of the outlet 110. For example, the pin 155 can connect to a circuit board, wiring, and/or other conductors. The outlet 110 further defines a plug receptacle 160. The plug receptacle 160 provides space for the plug 140 when the terminal block 100 couples to the outlet 110. The pins 155 are positioned within the plug receptacle 160. When a user inserts the plug 140 into the plug receptacle 160, the insulated portions 150 become positioned within the plug 140. In the illustrated embodiment, the number of pins 155 and the shape of the plug receptacle 160 correspond to the number of conduction paths in the terminal block 100. As should be appreciated, the outlet 110 could include a greater number of pins 155 than the number of conduction paths in the terminal block 100 and/or the plug receptacle 160 could be shaped to receive a connector with a greater number of conduction paths than in the terminal block 100.

Figure 3:
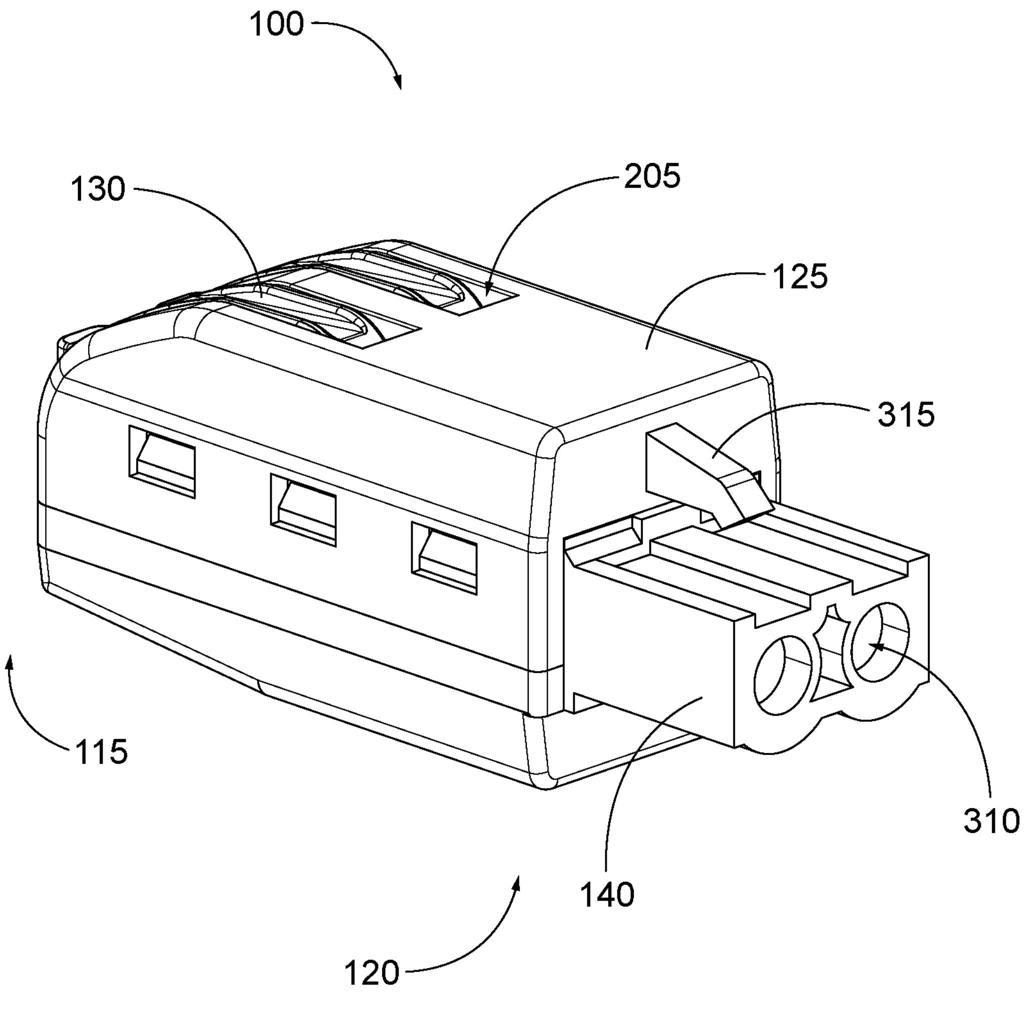
FIG. 3 is a perspective view of the FIG. 1 terminal block on an outlet side.
Figure 4:
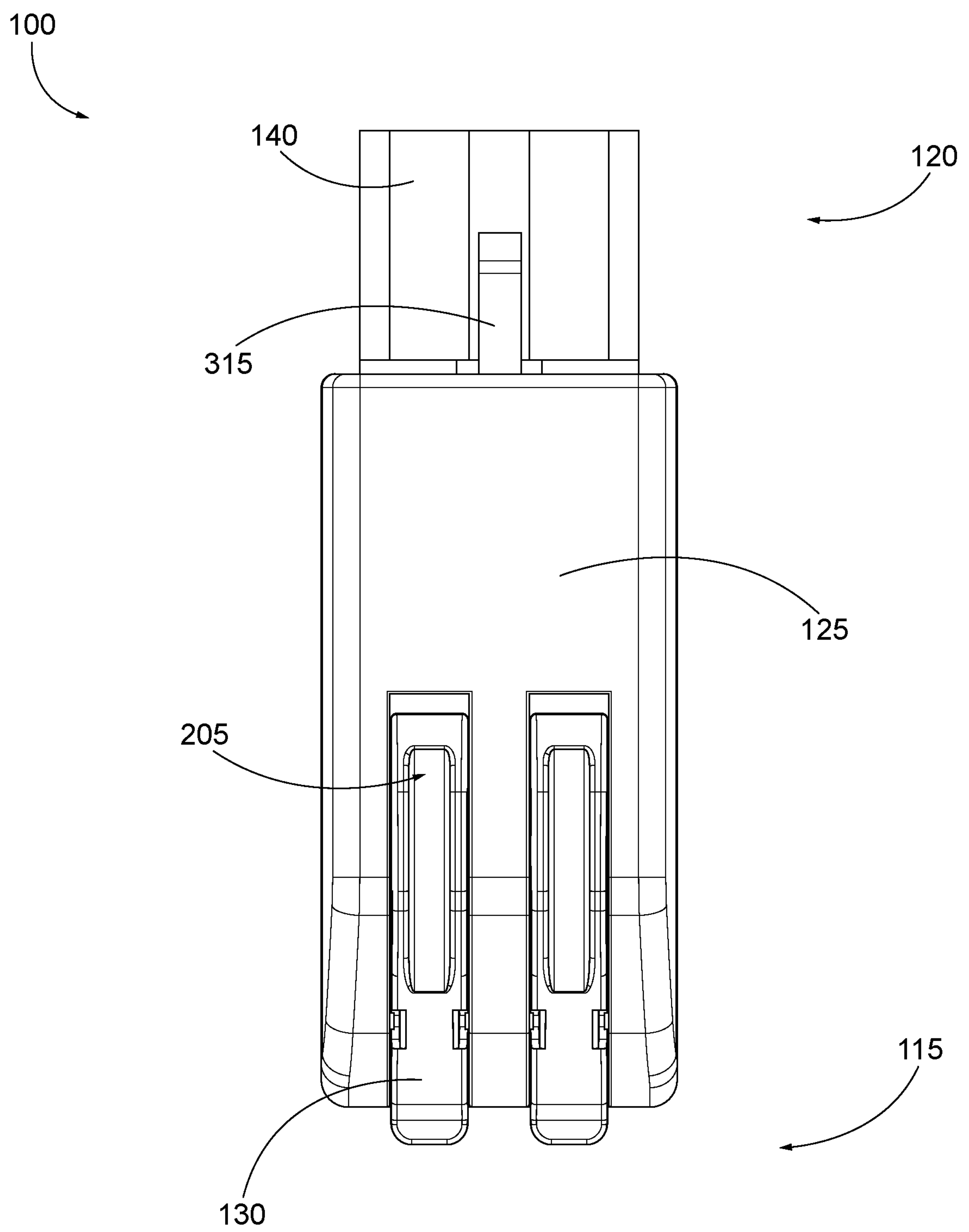
FIG. 4 is a top view of the FIG. 1 terminal block.
Figure 5:
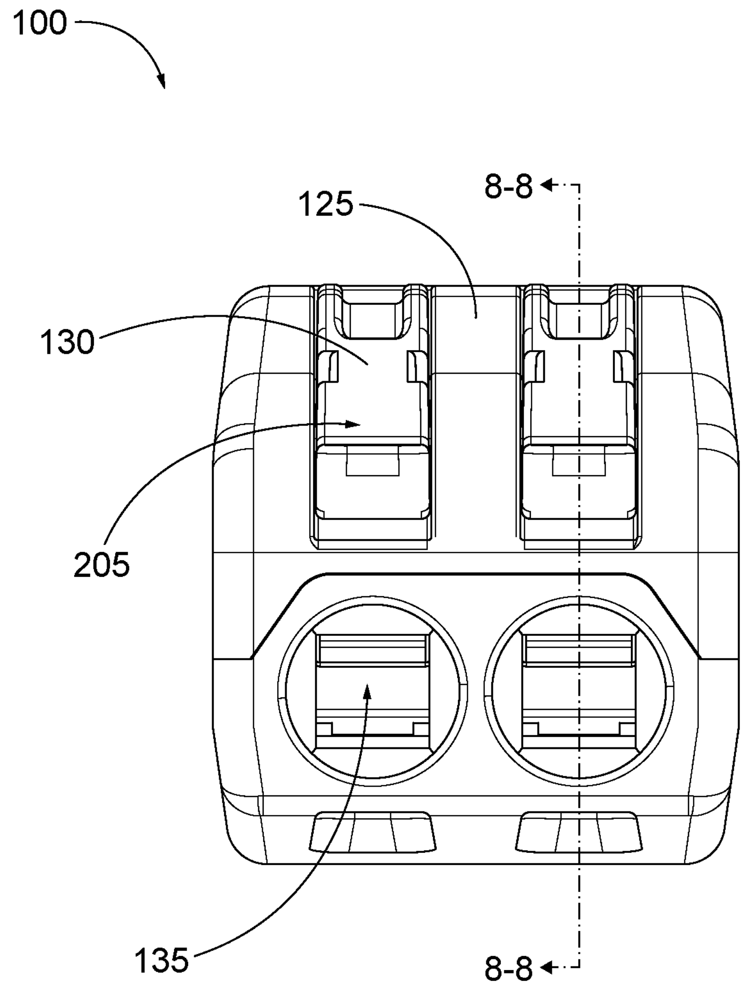
FIG. 5 is a side view of the FIG. 1 terminal block on a wire side.
Figure 6:
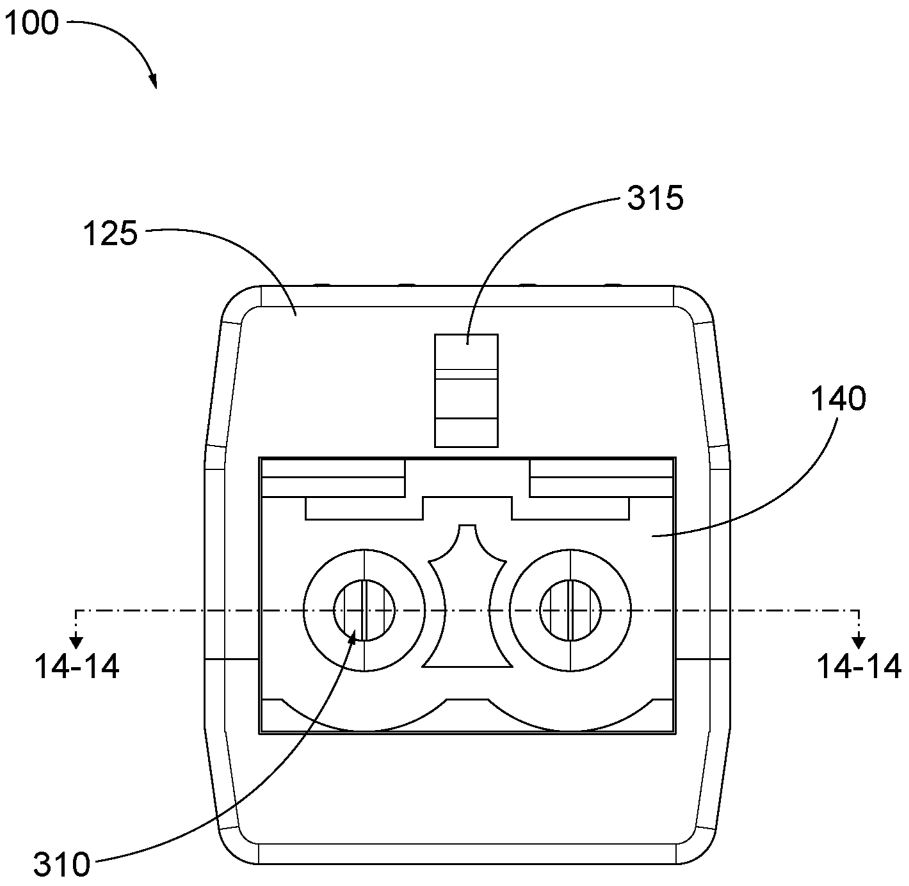
FIG. 6 is a side view of the FIG. 1 terminal block on an outlet side.

As shown in FIGS. 3 and 6, the plug 140 defines one or more plug openings 310. The plug openings 310 provide a space for the pins 155 when the terminal block 100 couples to the outlet 110. Specifically, when the plug 140 is positioned in the plug receptacle 160, the pins 155 are positioned within the plug 140 through the plug opening 310. In one embodiment, the terminal block 100 is configured to automatically electrically and mechanically couple to the pin 155 when the pin 155 is inserted into the plug opening 310. The number of plug openings 310 is the same as the number of wire openings 135. In this way, the wire 105 connected at each wire opening 135 can be electrically connected to the pin 155 at the corresponding plug openings 310. In one embodiment, the plug opening 310 is configured to receive conductors of the same size as in the wire opening 135. For example, the plug opening 310 can receive the pin 155 with a width between 0.5 and 2.5 millimeters. In another example, the plug opening 310 can receive the wire 105 between 12 and 24 AWG. As should be appreciated, the plug openings 310 could receive other types of electrical conductors in addition and/or alternatively to the pin 155, such as the wire 105.

The terminal block 100 further includes a clip 315 that is configured to facilitate mechanical coupling between the terminal block 100 and the outlet 110. The clip 315 extends from the body 125 on the outlet side 120. In the shown embodiment, the clip 315 is bent such that when the terminal block 100 couples to outlet 110, a portion of the clip 315 extends around and contacts a portion of the outlet 110. Through such contact, the clip 315 limits or fully prevents movement of the terminal block 100 relative to the device. For example, the clip 315 fixes the position of the plug 140 within the plug receptacle 160.

Figure 7:
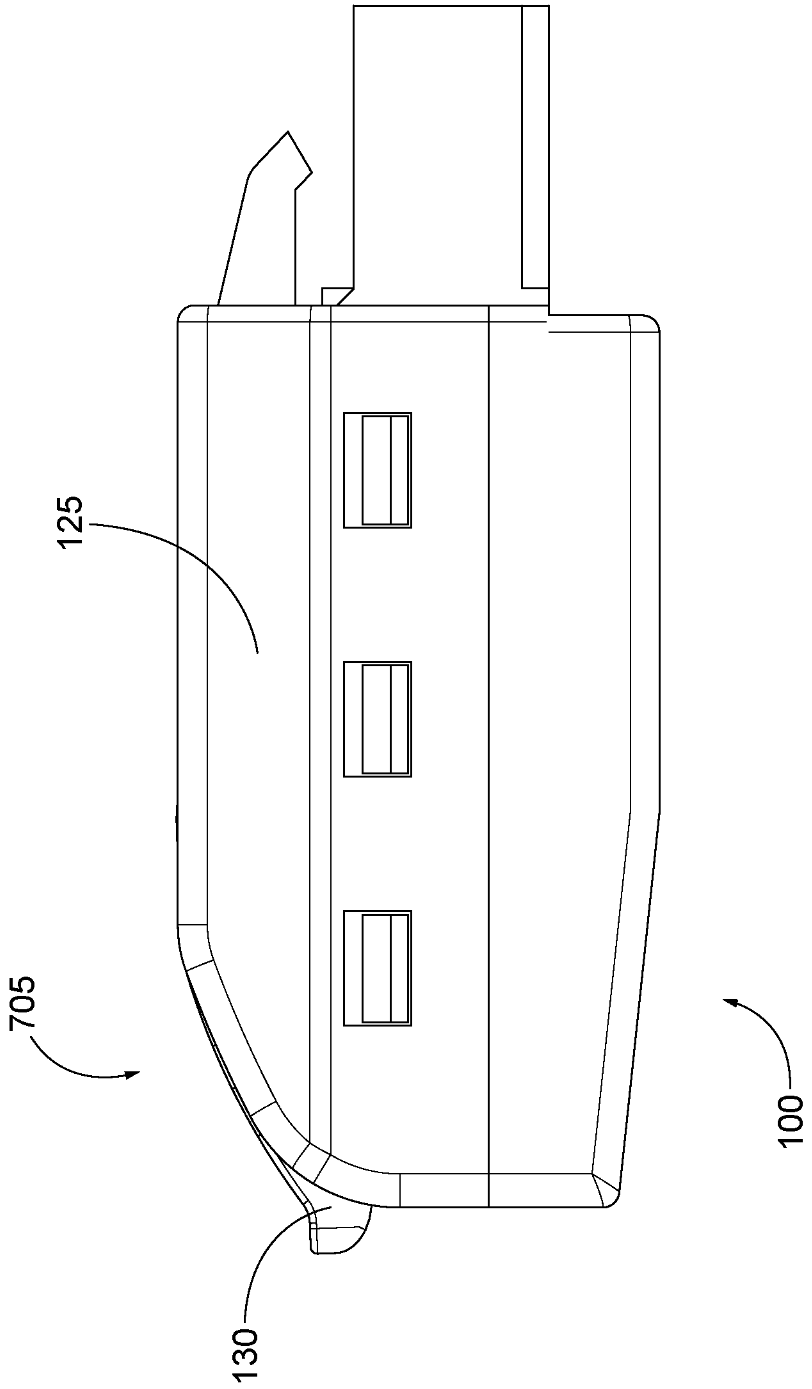
FIG. 7 is a side view of the FIG. 1 terminal block in a closed position.

Referring to FIG. 7, the terminal block 100 and lever 130 is primarily configured to be in a closed position 705. In the closed position 705, the terminal block 100 is configured to mechanically secure the wire 105 when the wire 105 is positioned in the wire opening 135. The lever 130 is positioned within the channel 205, as shown in FIGS. 2-5. By positioning the lever 130 in the channel 205 for the closed position 705, the lever 130 blends into the shape of the body 125. Therefore, the risk is low for a user and/or object to accidentally rotate the lever 130 out of the channel 205. In this way, the terminal block 100 is configured to maintain reliable electrical and mechanical connections to the wire 105. A small portion of the lever 130 extends out of the channel 205 in the closed position 705 to allow a user to rotate the lever 130. However, as noted, the majority of the lever 130 is positioned within the channel 205 in the closed position 705.

Figure 8:
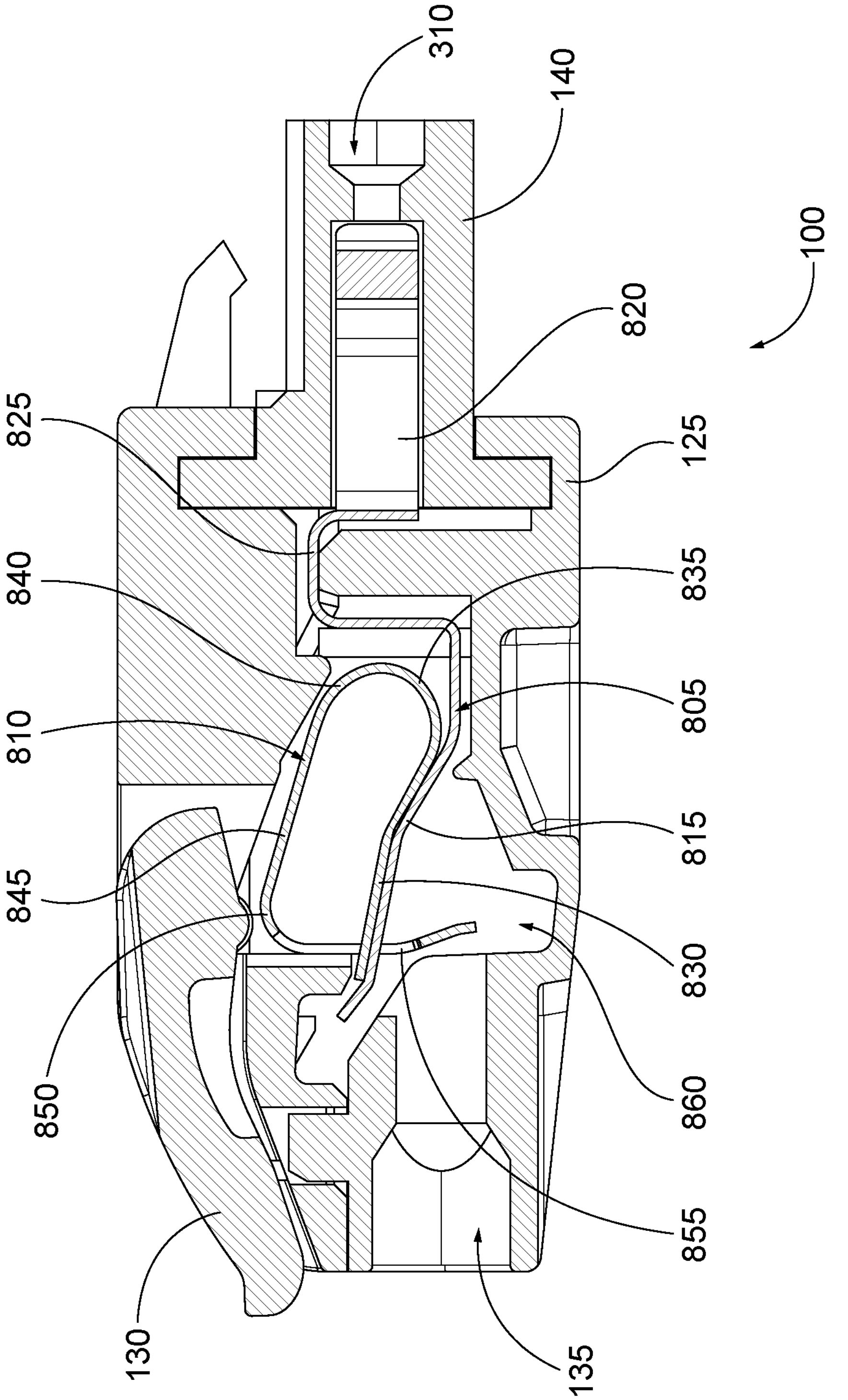
FIG. 8 is a cross-sectional view of the FIG. 7 terminal block as taken along line 8-8 in FIG. 5.

Referring to FIG. 8, the terminal block 100 includes a busbar 805 and a spring 810 on an interior portion. The busbar 805 is configured to electrically connect conductors positioned in the wire opening 135 to conductors positioned in the plug opening 310. For example, the busbar 805 is configured to contact the wire 105 on one end and to contact the pin 155 of the outlet 110 on another end. The busbar 805 is made of a conductive material, such as copper and/or aluminum. In one example, the busbar 805 is gold plated. Further, the busbar 805 is shaped such as to provide structural support to the spring 810. As illustrated, the busbar 805 forms a platform for and is positioned below the spring 810 such as to provide support for the spring 810. In one embodiment, the body 125 is configured to contact and provide structural support for the busbar 805 and/or spring 810. The spring 810 is used to facilitate an electrical connection between the wire 105 and the busbar 805. When the wire 105 is inserted within the body 125 through the wire opening 135, the spring 810 is configured to apply force to the wire 105 such that the wire 105 contacts the busbar 805. The force from the spring 810 supports the wire 105 to consistently contact the busbar 805 and establish a reliable electrical connection with the busbar 805. In one embodiment, the spring 810 includes a conductive material, such as a material used in the busbar 805.

The busbar 805 generally includes a strut 815, a socket 820, and an intermediate portion 825. The strut 815 is positioned towards the wire side 115. When the wire 105 is positioned within the terminal block 100 and the lever 130 is arranged in the closed position 705, the strut 815 is configured to contact the wire 105. In the illustrated embodiment, the strut 815 provides a mostly flat surface for the wire 105 to contact. In one embodiment, the strut 815 includes multiple flat portions that are oriented at an angle to one another. In an alternative embodiment, the strut 815 is shaped such as to at least partially curve around the wire 105. Opposite the strut 815, the socket 820 is positioned towards the outlet side 120. When the terminal block 100 is coupled to the outlet 110, the socket 820 is configured to contact the pin 155 of the outlet 110. In one embodiment, the socket 820 is configured to automatically mechanically and electrically couple to the pin 155 when the terminal block 100 and outlet 110 couple together. For example, the socket 820 can compress the pin 155 and/or another conductor to establish mechanical and electrical contact when the conductor is pushed into the socket 820. In this way, the socket 820 supports making quick electrical connections without the need for tools or other equipment. The intermediate portion 825 is positioned between the strut 815 and socket 820 in order to form a continuous busbar 805. In the illustrated example, the intermediate portion 825 is arched. In one instance, the arched shape of the intermediate portion 825 and the interior of the body 125 limit or completely prevent movement of the busbar 805 in a direction between the wire side 115 and outlet side 120.

The spring 810 generally includes a base 830 and a fulcrum 835. The base 830 is configured to rest on the busbar 805 and provide support for the spring 810. The base 830 extends into the fulcrum 835 which forms a pivot point for the spring 810. In the configuration shown in FIG. 8, the spring 810 is in a resting position 840. Typically, the spring 810 is in the resting position 840 when the lever 130 is in the closed position 705. The lever 130 does not apply a force on the spring 810 when in the closed position 705. Therefore, the spring 810 does not undergo a compressive force from the lever 130 and can be relaxed in the resting position 840.

From the fulcrum 835, the spring 810 further extends into an arm 845. When the spring 810 compresses, the arm 845 pivots around the fulcrum 835 relative to the base 830. Typically, the base 830 remains stationary as the arm 845 pivots. The arm 845 transitions into a bend 850 towards the wire side 115 and then into a leg 855. The bend 850 is configured to orient the leg 855 towards the busbar 805 and base 830. In one example, the bend 850 defines an angle less than 180 degrees between the arm 845 and leg 855. In another instance, the bend 850 defines an angle from 45 degrees to 90 degrees between the arm 845 and leg 855. In the illustrated embodiment, the leg 855 extends past the busbar 805 and base 830 while the spring 810 is in the resting position 840. The body 125 defines a cavity 860 that provides clearance for the leg 855.

Figure 9:
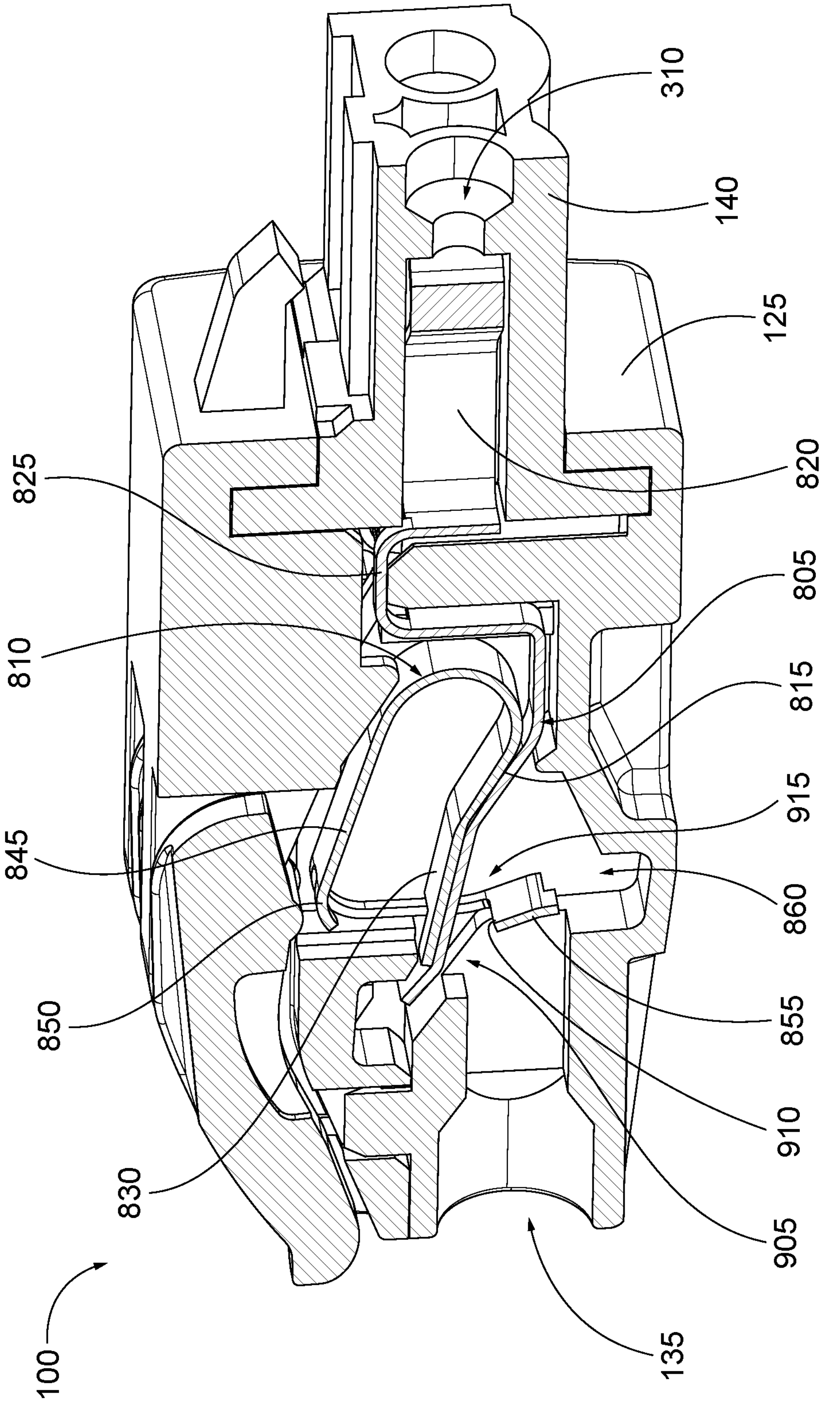
FIG. 9 is a cross-sectional perspective view of the FIG. 7 terminal block as taken along line 8-8 in FIG. 5.

FIG. 9 shows another cross-sectional view of the terminal block 100 with the lever 130 in the closed position 705. As illustrated, the spring 810 defines an aperture 905 through the leg 855. In the shown embodiment, the aperture 905 is fully circumferential and fully enclosed by the leg 855. The aperture 905 provides space for the busbar 805 and for the base 830 of the spring 810 to pass through. Further, the aperture 905 provides space for the wire 105 when the wire 105 is positioned inside the terminal block 100.

The spring 810 further includes an edge 910 on a portion of the leg 855. The edge 910 defines one side of the aperture 905 and is configured to contact the wire 105 when the wire 105 is coupled to the terminal block 100. The busbar 805 and spring 810 define a gap 915 within the aperture 905 between the edge 910 and the busbar 805. The gap 915 provides space for the wire 105 to be positioned when coupled to the terminal block 100. When the spring 810 is in the resting position 840, the edge 910 is positioned closer to the busbar 805 such that the gap 915 is smaller.

Figure 10:
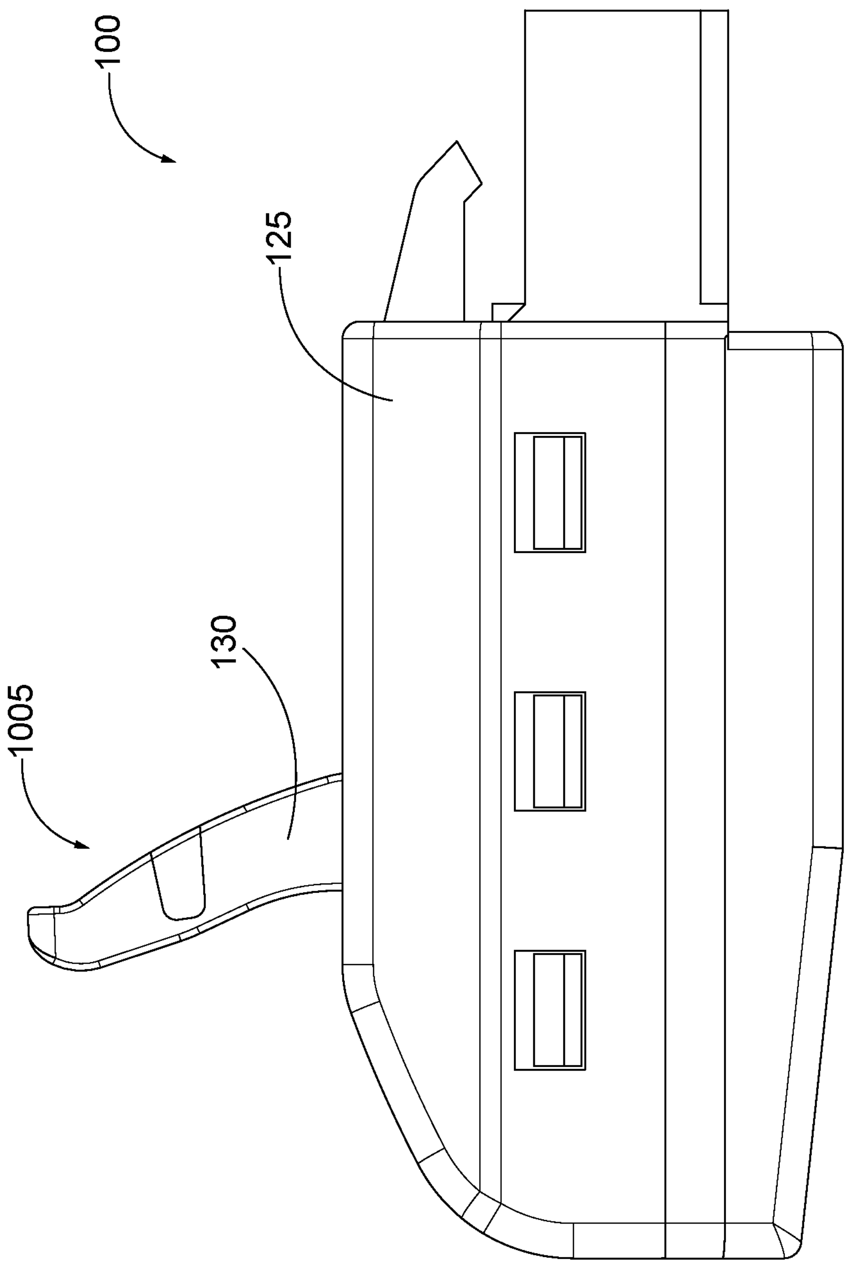
FIG. 10 is a side view of the FIG. 1 terminal block in an open position.
Figure 11:
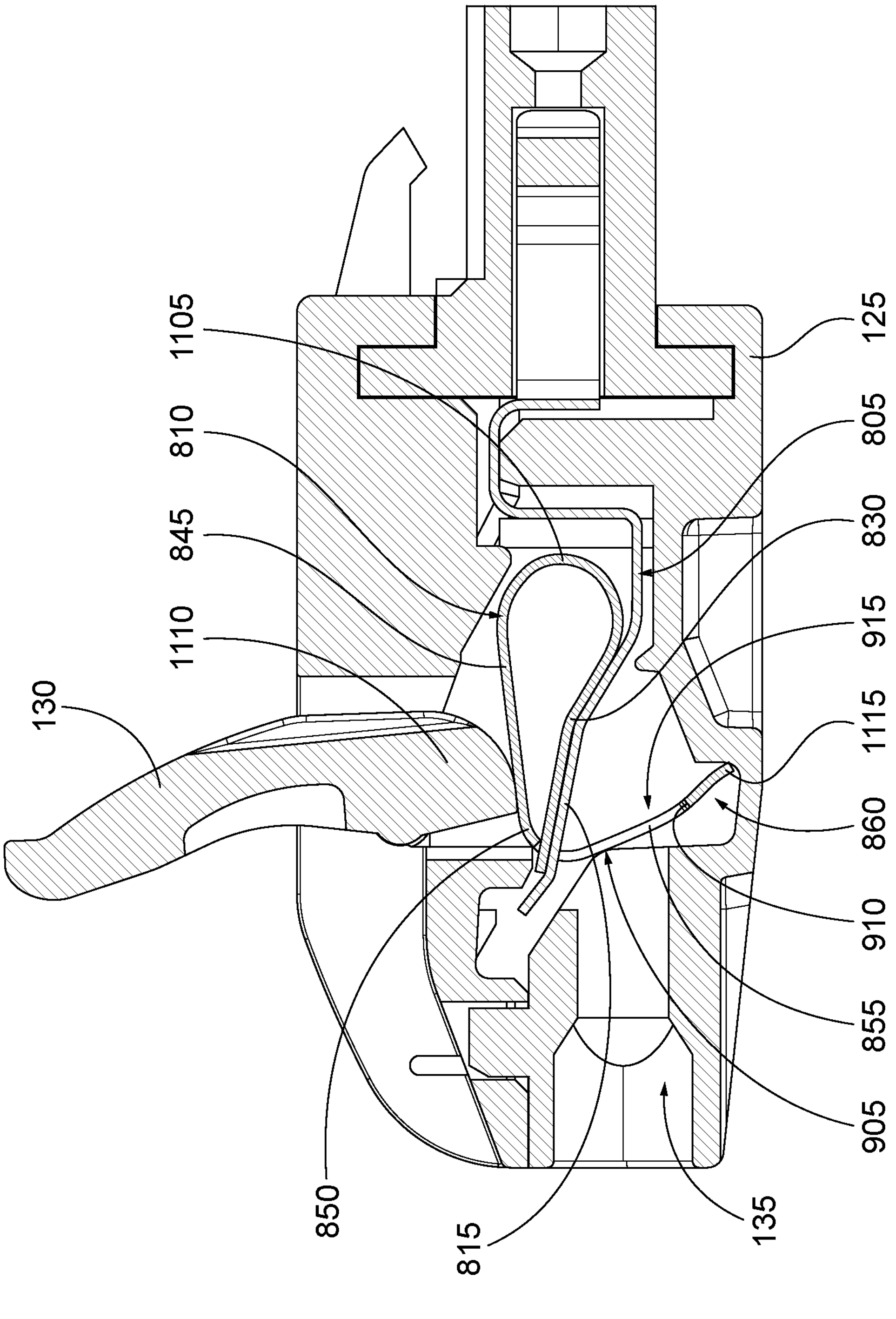
FIG. 11 is a cross-sectional view of the FIG. 10 terminal block as taken along line 8-8 in FIG. 5.

Referring to FIGS. 10 and 11, the terminal block 100 is shown with the lever 130 in an open position 1005. When the lever 130 is rotated out of the plug 140, the lever 130 is moved from the closed position 705 to the open position 1005. As shown in FIG. 11, when the lever 130 rotates into the open position 1005, the lever 130 compresses the spring 810 into a compressed position 1105. The lever 130 includes a lobe 1110. The lobe 1110 is configured to pivot toward the spring 810 when the lever 130 pivots into the open position 1005. In the open position 1005, the lobe 1110 contacts and applies force to the spring 810 such that the arm 845 pivots toward the base 830 about the fulcrum 835. As the spring 810 compresses, the leg 855 moves into the cavity 860. The edge 910 is therefore positioned further away from the busbar 805 than when the spring 810 is in the fulcrum 835. As a result, the gap 915 is expanded in the compressed position 1105 compared to the fulcrum 835. The expanded size of the gap 915 allows the wire 105 to be inserted into the terminal block 100 and through the aperture 905. Further, the aperture 905 is aligned with the wire opening 135 when the spring 810 is in the compressed position 1105. The position of the aperture 905 allows a user to insert the wire 105 through the wire opening 135 and directly into the aperture 905. In the illustrated example, the spring 810 contacts the body 125 within the cavity 860 when the spring 810 is in the compressed position 1105. As shown, the spring 810 includes a tongue 1115 on the end of the leg 855. As the spring 810 is compressed, the tongue 1115 contacts the body 125 such as to prevent further compression of the spring 810. In one embodiment, the maximum size of the gap 915 is limited by the tongue 1115 contacting the body 125. For example, the maximum size of the gap 915 is limited to accommodate the wire 105 as large as 12 AWG.

Figure 12:
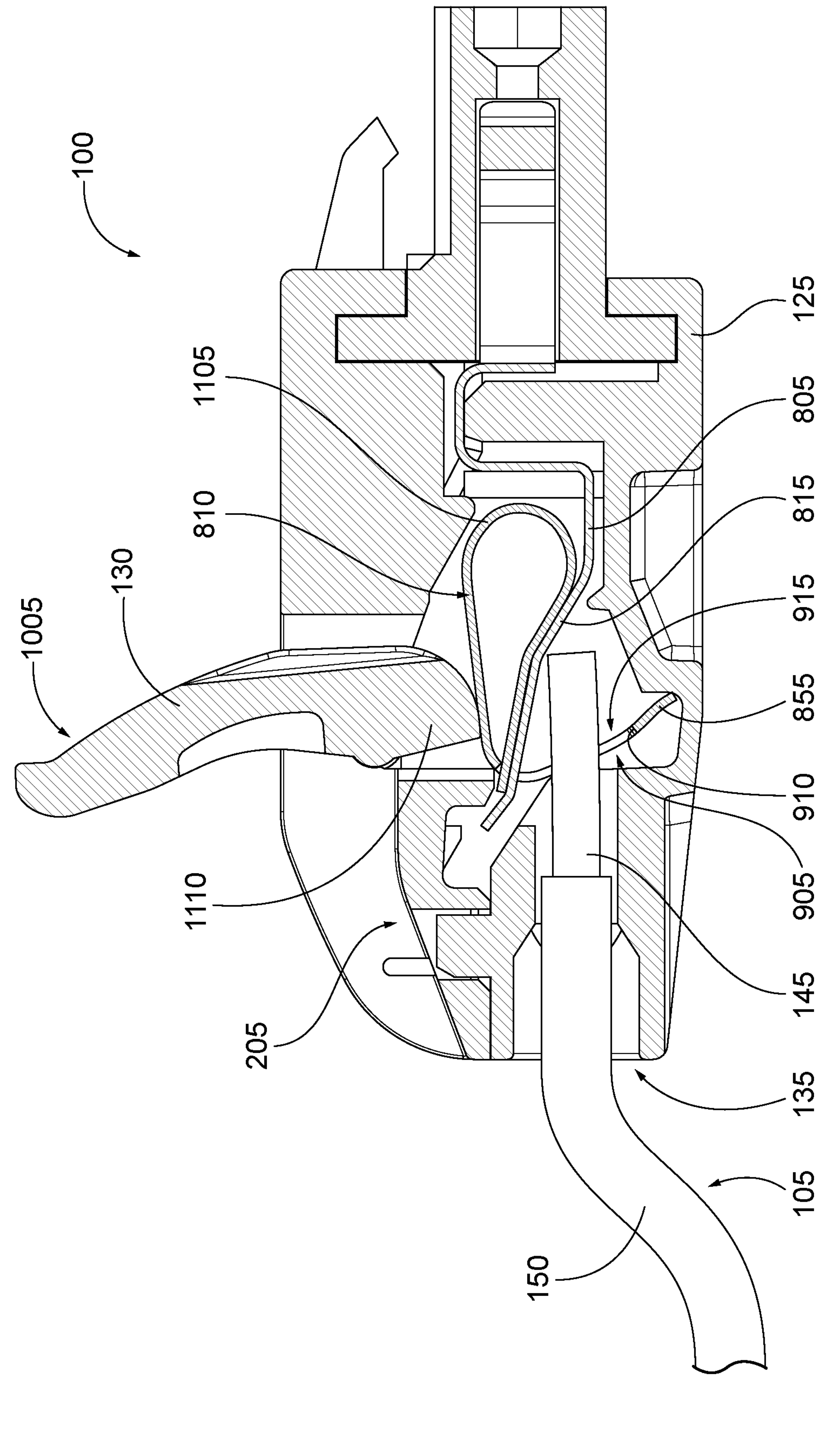
FIG. 12 is a cross-sectional view of the FIG. 1 terminal block and wire in a closed position.

FIG. 12 depicts the terminal block 100 with the lever 130 in the open position 1005 and with the wire 105 positioned within the terminal block 100. As shown, the wire 105 is positioned through the wire opening 135. In the illustrated embodiment, the conductive portion 145 is positioned within the aperture 905. In another embodiment, the conductive portion 145 and the insulated portion 150 can be positioned within the aperture 905. In the illustrated arrangement, the wire 105 is free to move into and/or out of the aperture 905. As noted previously, the lever 130 compresses the spring 810 such that the leg 855 moves away from the busbar 805 and such that the gap 915 expands to a size larger than the wire 105. In this way, the wire 105 can move within the gap 915 without being compressed between the edge 910 of the spring 810 and the strut 815 of the busbar 805. A user can move the lever 130 into the open position 1005 and expand the gap 915 when the user is inserting the wire 105 into the terminal block 100 and/or when the user is removing the wire 105 from the terminal block 100. The terminal block 100 allows the user to easily insert a new wire 105, replace an old wire 105, and/or adjust the connection between the wire 105 and the terminal block 100 without the need for additional tools.

Figure 13:
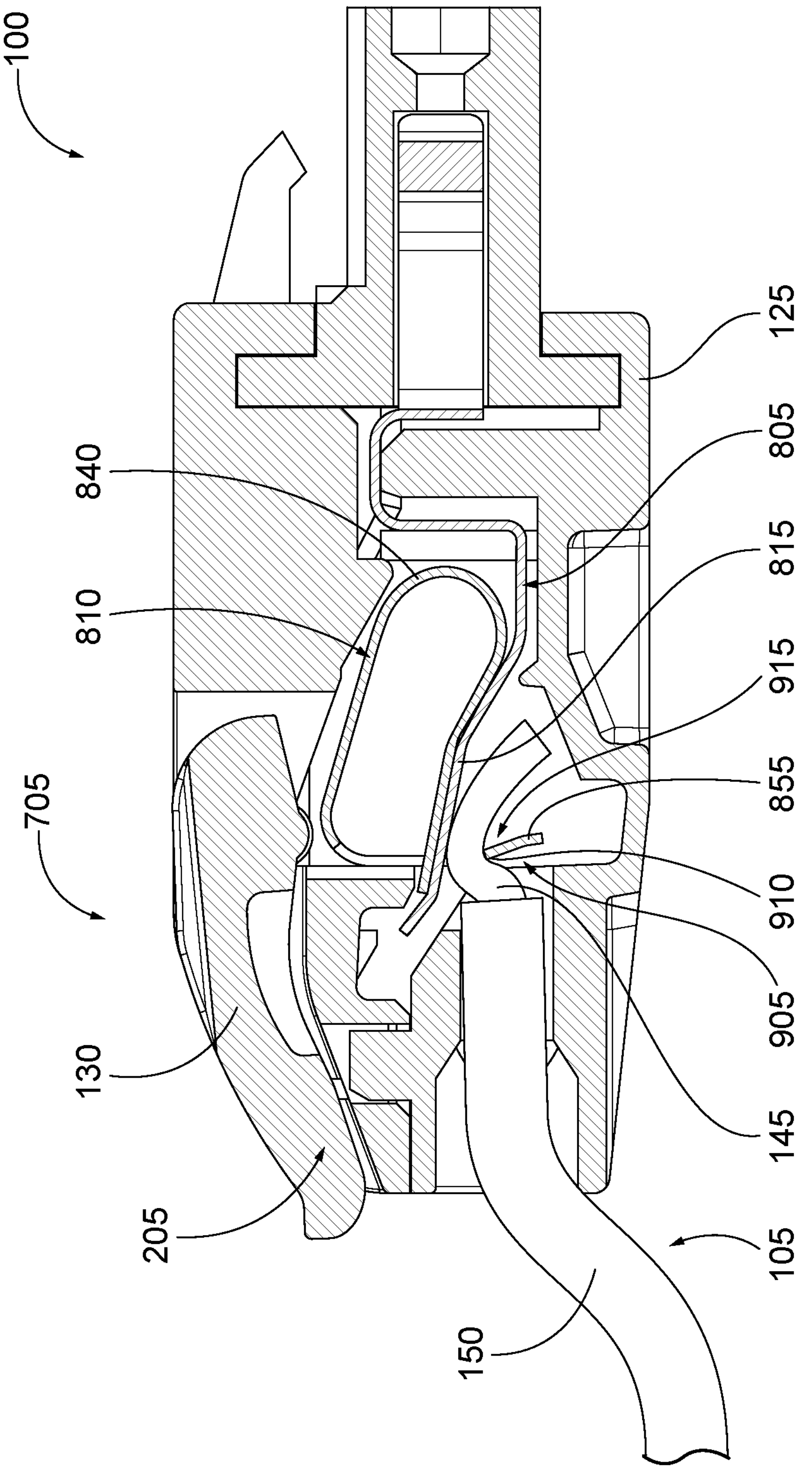
FIG. 13 is a cross-sectional view of the FIG. 1 terminal block and wire in an open position.

FIG. 13 depicts the wire 105 coupled to the terminal block 100. As shown, the terminal block 100 is configured to couple to the wire 105 when the lever 130 is in the closed position 705. After inserting the wire 105 into the terminal block 100 as shown in FIG. 12, user can rotate the lever 130 into the closed position 705 to couple the wire 105 to the terminal block 100 as shown in FIG. 13. In one example, the user rotates the lever 130 into the open position 1005 from the closed position 705 in order to decouple the wire 105 from the terminal block 100. In another example, the user inserts a new wire 105 into the terminal block 100 and then rotates the lever 130 into the closed position 705 to couple a new wire 105 to the terminal block 100. In an alternative example, the user rotates the lever 130 into the closed position 705 without inserting the wire 105.

As shown, the spring 810 applies force to the wire 105 such as to electrically connect the conductive portion 145 of the wire 105 to the busbar 805 and such as to mechanically secure the wire 105 within the terminal block 100. When the lever 130 is rotated to the closed position 705, the spring 810 returns to the resting position 840. The edge 910 of the spring 810 then moves toward the busbar 805 and reduces the gap 915. With the wire 105 positioned within the aperture 905, the edge 910 is configured to contact the wire 105. The edge 910 is configured to apply force to the wire 105 such that the conductive portion 145 contacts the busbar 805 on the strut 815. The contact enables an electrical connection between the conductive portion 145 and busbar 805. Further, the force from the spring 810 maintains the contact between the conductive portion 145 and busbar 805 such as to promote a stable electrical connection. The lever 130 and spring 810 enable a user to establish a reliable and stable electrical connection between the wire 105 and terminal block 100 without the need for additional tools.

Figure 14:
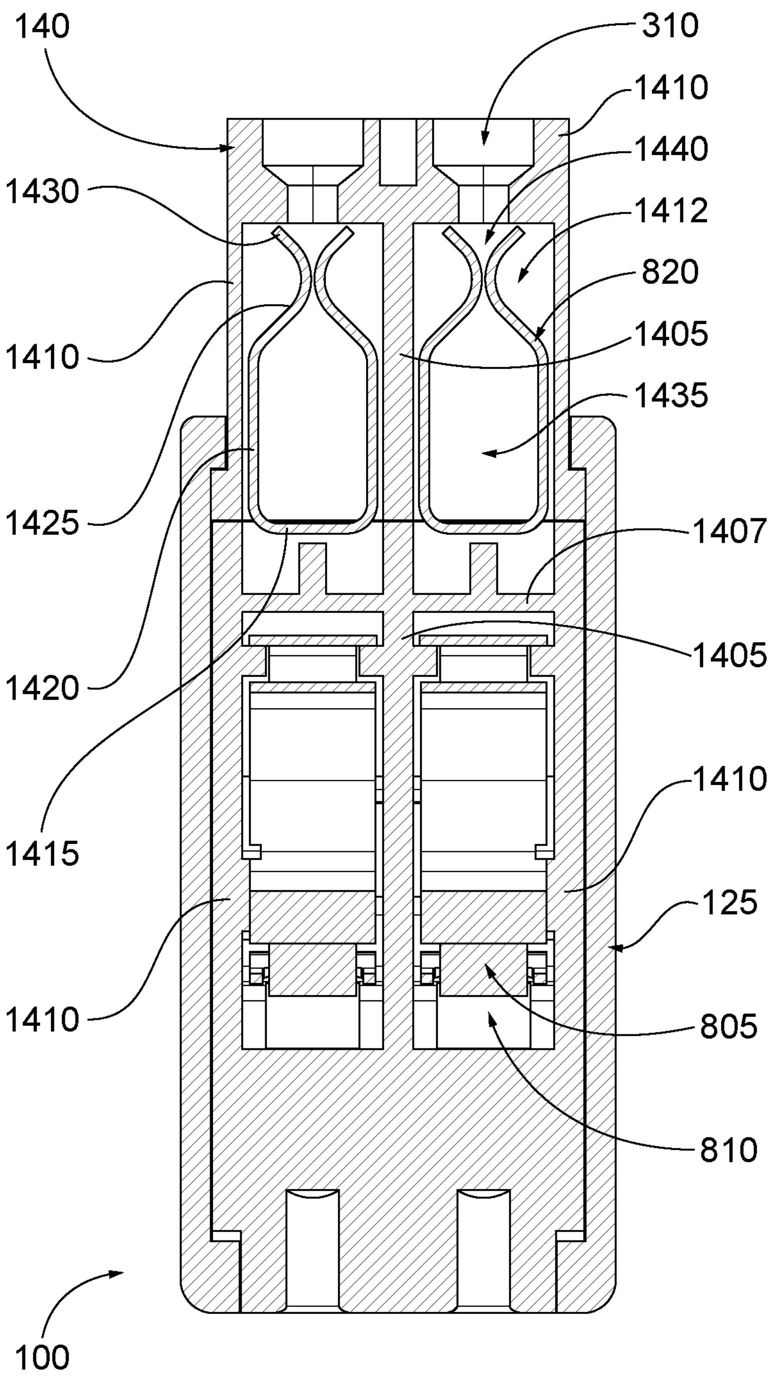
FIG. 14 is a cross-sectional view of the FIG. 1 terminal block as taken along line 14-14 in FIG. 6.

Referring to FIG. 14, the terminal block 100 further includes a divider 1405, spacers 1407, and sidewalls 1410. In the shown embodiment, the divider 1405 is formed from portions of the body 125 and the plug 140. In an alternate embodiment, the divider 1405 is a separate part from the body 125 and/or plug 140. The divider 1405 is configured to separate multiple busbars 805 within the terminal block 100. By separating the busbars 805, the divider 1405 prevents the busbars 805 from contacting and electrically connecting to each other. The terminal block 100 promotes each busbar 805 to form a distinct conduction path between the wire side 115 and the outlet side 120 by including the divider 1405. To prevent unwanted electrical connections, the divider 1405 is made of an insulative material. The divider 1405 further provides structural support to the terminal block 100. In one example, the divider 1405 provides structural support on the interior of the body 125 and the plug 140. In another example, the divider 1405 supports the busbar 805 and/or spring 810 in a lateral direction such as to limit or prevent movement of the busbar 805 and/or spring 810. In the FIG. 14 embodiment, the terminal block 100 includes one divider 1405 that is positioned between two busbars 805. As should be appreciated, the terminal block 100 generally includes at least one divider 1405 positioned between every two neighboring busbars 805. For example, the terminal block 100 can include two dividers 1405 intermittently positioned between three busbars 805, three dividers 1405 intermittently positioned between four busbars 805, four dividers 1405 intermittently positioned between five busbars 805, and so on.

The spacers 1407 are generally formed from a portion of the body 125. In another embodiment, the spacers 1407 can be separate pieces from the body 125. The spacers 1407 are configured to provide support between the strut 815 and the socket 820 of the busbar 805. In this position, the spacers 1407 limit or prevent movement of the busbar 805 between the wire side 115 and the outlet side 120. For example, the spacer 1407 allows the busbar 805 to maintain the same position when conductors contact the busbar 805 when being inserted into the wire opening 135 and/or plug opening 310. Additionally, the spacer 1407 provides support to the spring 810 to limit or prevent movement in a similar way.

In the shown embodiment, the sidewalls 1410 are formed from portions of the body 125 and the plug 140. In another embodiment, the sidewalls 1410 can be separate parts from the body 125 and/or the plug 140. The sidewall 1410 is configured to provide structural support to the terminal block 100 and to electrically insulate the busbars 805 from external objects. In one example, the sidewall 1410 supports the busbar 805 and/or spring 810 in a lateral direction in combination with the divider 1405 such as to limit or prevent movement of the busbar 805 and/or spring 810. The sidewalls 1410 are generally made from an insulative material. By insulating the busbars 805 from external objects, the sidewalls 1410 are configured to prevent incidental contact with other conductors, such as neighboring wires 105, pins 155, and/or the busbar 805 in another terminal block 100.

As illustrated, the plug 140 defines a socket opening 1412 between the divider 1405 and the sidewall 1410. In another embodiment, the plug 140 defines the socket opening 1412 between two dividers 1405 or between two sidewalls 1410. The socket opening 1412 provides space for the socket 820 of the busbar 805. Further, the socket opening 1412 provides enough space for the socket 820 to expand when the pin 155 is positioned within the socket 820. As noted previously, the plug opening 310 provides space for the pin 155 to enter the terminal block 100 on the outlet side 120. The plug opening 310 leads to the socket opening 1412 such that the conductor can pass through the plug opening 310 and into the socket opening 1412. In the illustrated embodiment, the plug opening 310 is smaller in width than the socket opening 1412. The socket 820 does not extend into the plug opening 310 in this arrangement. By positioning the socket 820 in the socket opening 1412, the plug 140 forms a buffer such that the pin 155 must travel a certain distance into the plug 140 before contacting the socket 820. In an alternate embodiment, the plug opening 310 is the same shape and width as the sidewall 1410. As should be appreciated, the socket 820 could couple to other types of conductors in addition and/or alternatively to the pin 155.

The socket 820 generally includes a panel 1415, leaves 1420, arches 1425, and lips 1430. The panel 1415 is positioned towards the spacer 1407 and extends from the intermediate portion 825 shown in FIG. 8. Two leaves 1420 extend from the panel 1415 towards the outlet side 120. In the shown embodiment, each leaf 1420 is oriented at an angle of 90 degrees relative to the panel 1415. As a result, the leaves 1420 are oriented parallel to each other. In another example, the leaves 1420 can be oriented at an angle between 45 and outlet side 120 degrees relative to the panel 1415. In yet another example, each leaves 1420 can be oriented at a different angle to the panel 1415. As the leaves 1420 extend away from the panel 1415, each leaf 1420 transitions into an arch 1425. Each arch 1425 bends inward towards an opposite arch 1425 and away from the divider 1405 and/or sidewall 1410. In one example, the arches 1425 bend inward to the point of contacting one another. The arches 1425 then transition into the lips 1430. Each lip 1430 bends away from an opposite lip 1430 and towards the divider 1405 and/or sidewall 1410.

The socket 820 defines a pin opening 1435 between the leaves 1420. The pin opening 1435 provides a space for the pin 155 to be positioned when the terminal block 100 is coupled to the outlet 110 shown in FIG. 1. As should be appreciated, the pin opening 1435 could receive a conductor when not coupled to the outlet 110, such as by inserting the wire 105 at the outlet side 120. The pin opening 1435 extends between the panel 1415, leaves 1420, and arches 1425. When the pin 155 is positioned within the pin opening 1435, the arches 1425 are configured to contact the pin 155. The contact from the arches 1425 electrically connects the pin 155 to the busbar 805 and mechanically couples the pin 155 within the terminal block 100. Further, the socket 820 defines a mouth 1440 between the lips 1430. The mouth 1440 provides a space for the pin 155 to be positioned between the lips 1430 after passing through the plug opening 310. When the pin 155 enters the socket opening 1412 and contacts the lips 1430 and/or arches 1425, the arch 1425 are configured to bend outwards to accommodate the pin 155. The curved shape of the arches 1425 and lips 1430 encourages the arches 1425 to bend outward when the pin 155 applies a force towards the wire side 115. The socket 820 is generally rigid such as to broadly maintain the same shape. However, the socket 820 is configured to bend slightly around the arches 1425 when the pin 155 applies a force to the arches 1425. Therefore, the socket 820 is configured to couple to the pin 155 by compressing the pin 155 between the arches 1425. The terminal block 100 enables a user to automatically electrically and mechanically connect the pin 155 and/or another conductor without tools by inserting the conductor into the socket 820.

Figure 15:
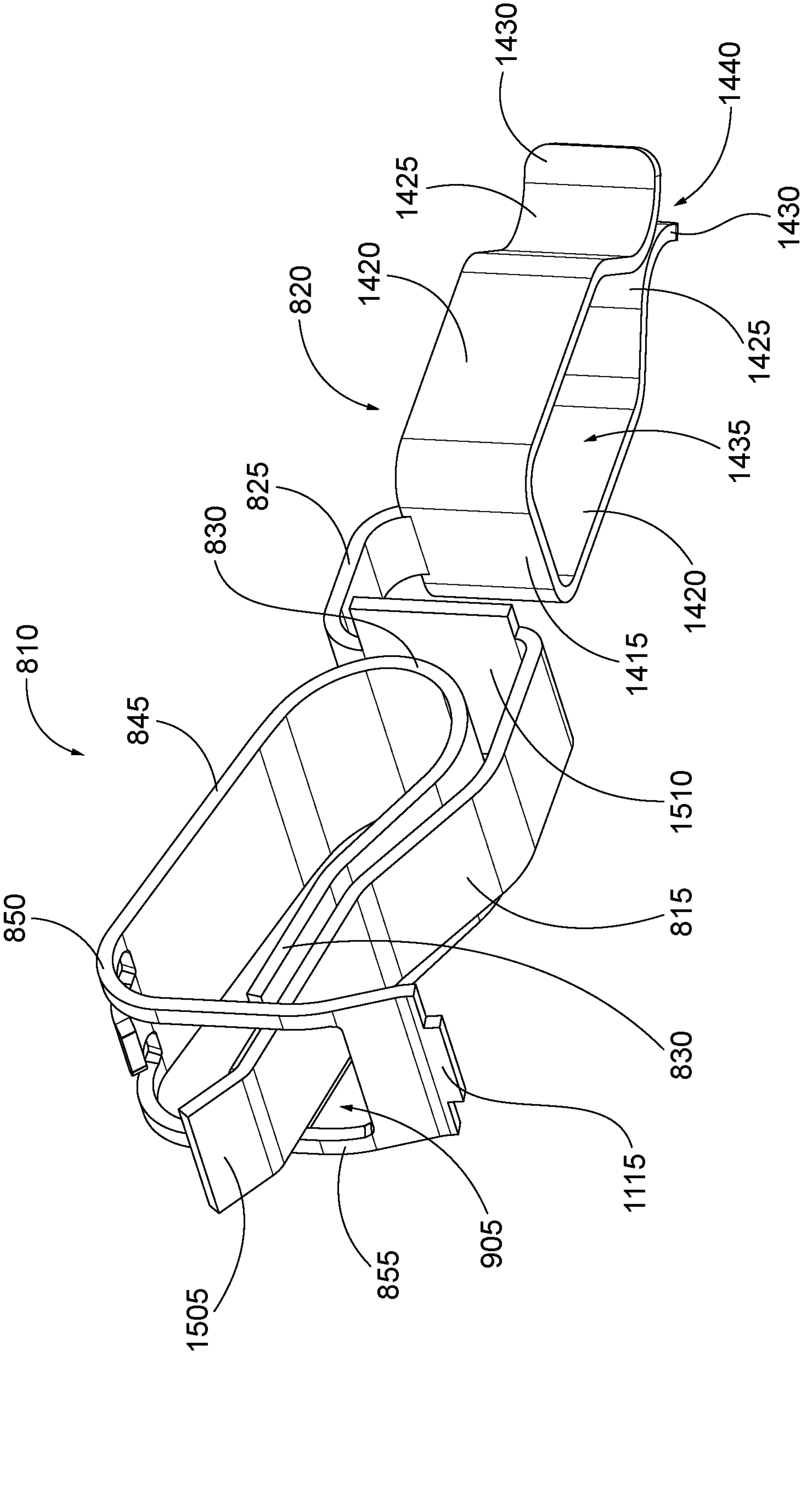
FIG. 15 is a perspective view of a busbar and a spring from the FIG. 1 terminal block.
Figure 16:
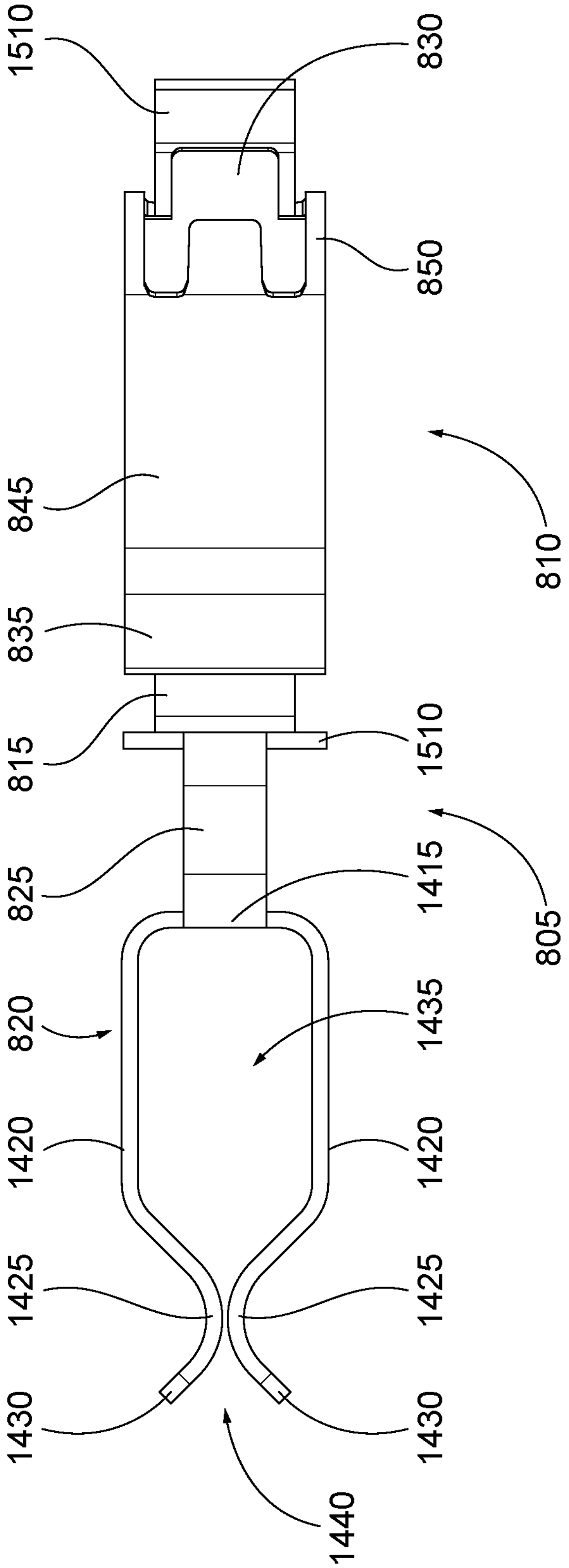
FIG. 16 is a top view of the FIG. 15 busbar and spring.

FIGS. 15 and 16 show the busbar 805 and spring 810 removed from the terminal block 100. As illustrated, the strut 815 of the busbar 805 extends through the aperture 905 to form a guide 1505. The guide 1505 provides stability to the leg 855 as the spring 810 compresses and relaxes. The guide 1505 is configured to limit or prevent movement of the leg 855 in other directions, such as towards the lateral sides. Further, the busbar 805 includes a flange 1510. The flange 1510 extends further outward than the rest of the busbar 805. By extending outward, the flange 1510 is configured to limit movement of the busbar 805 within the body 125. In one example, the flange 1510 extends fully between the dividers 1405 and/or sidewalls 1410 shown in FIG. 14. The flange 1510 is configured to limit movement of the busbar 805 between the dividers 1405 and/or sidewalls 1410 in this way. In another example, the flange 1510 contacts the spacer 1407 shown in FIG. 14. The flange 1510 is configured to limit the movement of the busbar 805 between the wire side 115 and outlet side 120 in this way. In the illustrated example, the flange 1510 is positioned adjacent to the strut 815 and intermediate portion 825. As should be appreciated, one or more flanges 1510 could be positioned at other points on the busbar 805 and/or spring 810.

In the illustrated example, the busbar 805 defines a similar thickness across the entire busbar 805. In one embodiment, the busbar 805 is formed by cutting a piece of conductive material using a laser, router, press, stamp, and/or other device. The cut piece of material is then bent and/or folded into the shape of the busbar 805. In another example, the busbar 805 can be formed using a mold. In one embodiment, the spring 810 is formed using the same techniques as the busbar 805.

Figure 17:
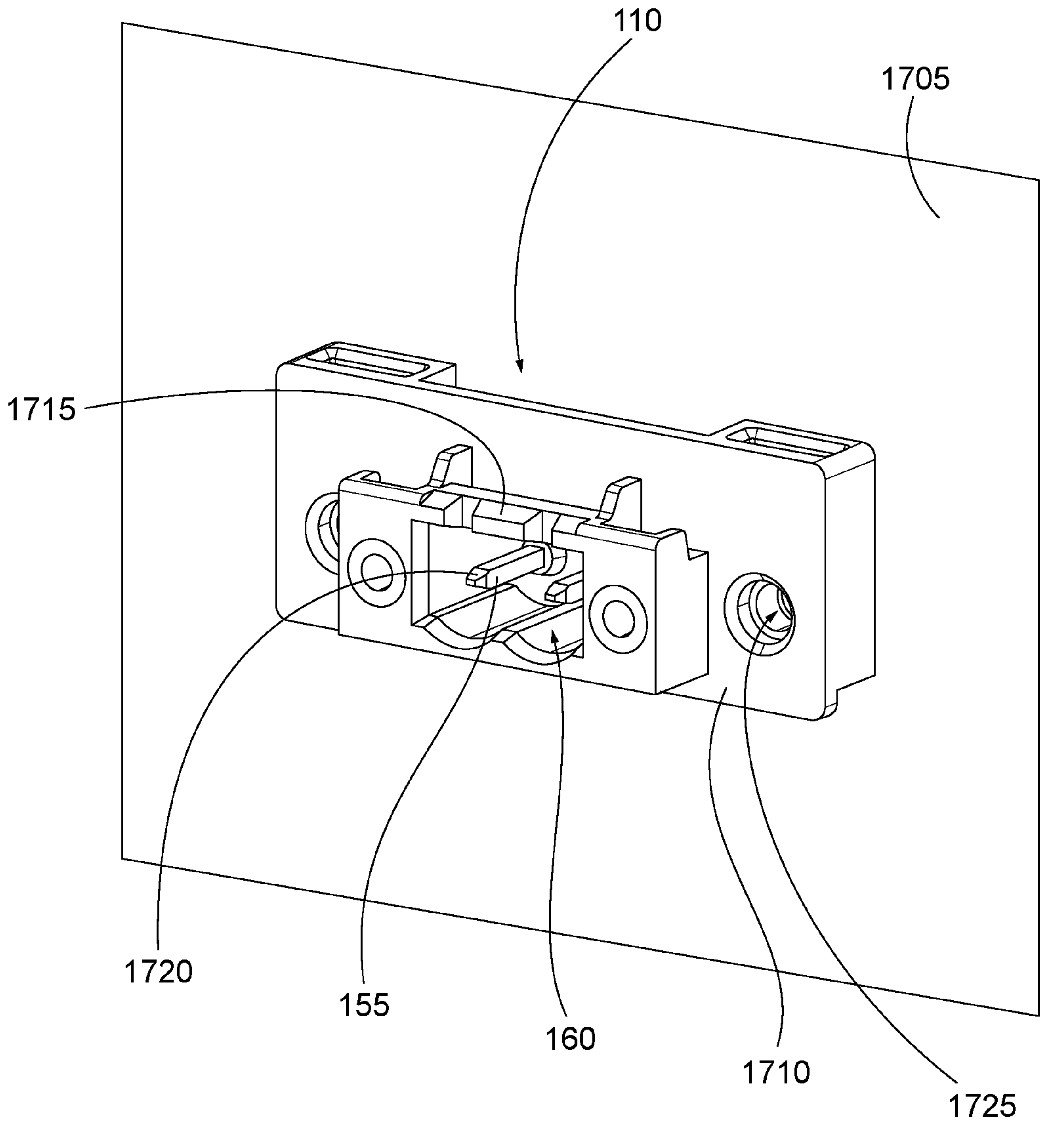
FIG. 17 is a perspective view of the FIG. 1 outlet.
Figure 18:
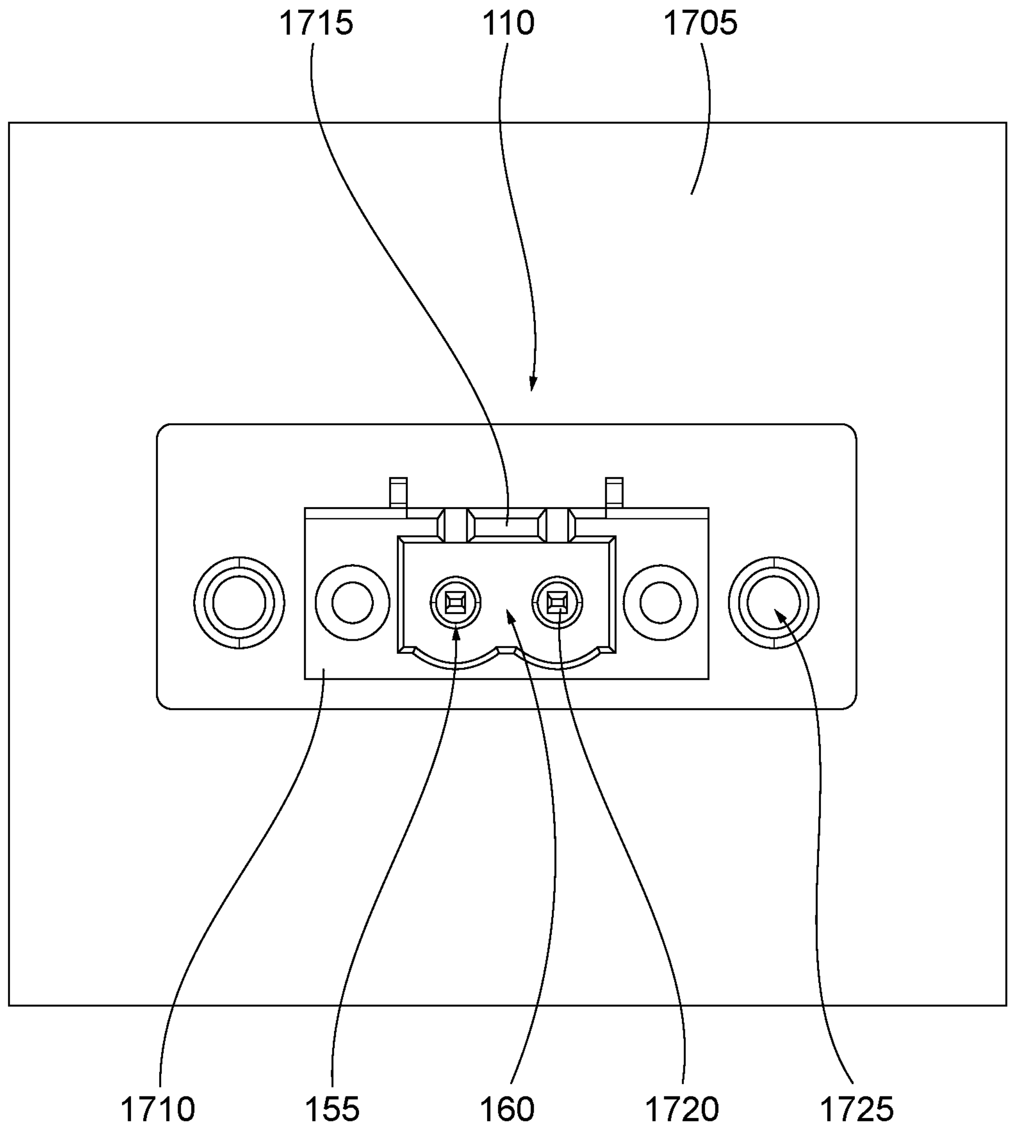
FIG. 18 is a front view of the FIG. 1 outlet.

Referring to FIGS. 17 and 18, the outlet 110 is configured to attach to a wall 1705. In one embodiment, the wall 1705 is part of a device such as a sound system, an automobile, and/or a power supply to name a few examples. In another embodiment, the wall 1705 is a wall in a building and/or an enclosure that contains wires and/or other conductors routed to a device.

As shown, the outlet 110 includes a frame 1710. The frame 1710 provides the structure of the outlet 110. The frame 1710 is generally made of a rigid material. When the terminal block 100 is coupled to the outlet 110, the frame 1710 is configured to support the terminal block 100. In one example, the frame 1710 is made of an insulative material, such as plastic. Further, the frame 1710 defines the shape of the plug receptacle 160 and provides structural support for the pins 155 within the plug receptacle 160. The frame 1710 includes a ridge 1715. When the terminal block 100 couples to the outlet 110, the ridge 1715 is configured to contact the clip 315 of the terminal block 100. The shape of the ridge 1715 allows a portion of the clip 315 to extend around the ridge 1715. The contact between the clip 315 and the ridge 1715 resists and/or limits movement of the terminal block 100 towards the wire side 115 when coupled to the outlet 110. As a result, the clip 315 and ridge 1715 strengthen the mechanical coupling between the terminal block 100 and outlet 110. In one embodiment, a user must lift the clip 315 away from the ridge 1715 before removing the terminal block 100 from the outlet 110.

The pins 155 each include a tip 1720. The tip 1720 extend on the pin 155 towards the wire side 115. The tip 1720 tapers from the rest of the pin 155 as the tip 1720 extends towards the wire side 115. By having a tapered shape, the tip 1720 is configured to easily push the arches 1425 apart as the tip 1720 moves towards the wire side 115. The tip 1720 therefore supports the pin 155 to easily insert in the socket 820. In one embodiment, the tip 1720 tapers fully to a single point on the end of the pin 155.

The frame 1710 further defines one or more fastener openings 1725. The fastener opening 1725 provides an opening for a screw, bolt, and/or another type of fastener to couple the outlet 110 to the wall 1705. In an alternate embodiment, the outlet 110 couples to the wall 1705 through a fastener that doesn't require the fastener opening 1725, such as a clip and/or an adhesive. In another embodiment, the outlet 110 is integrally formed with the wall 1705 and no fastener is needed.

Figure 19:
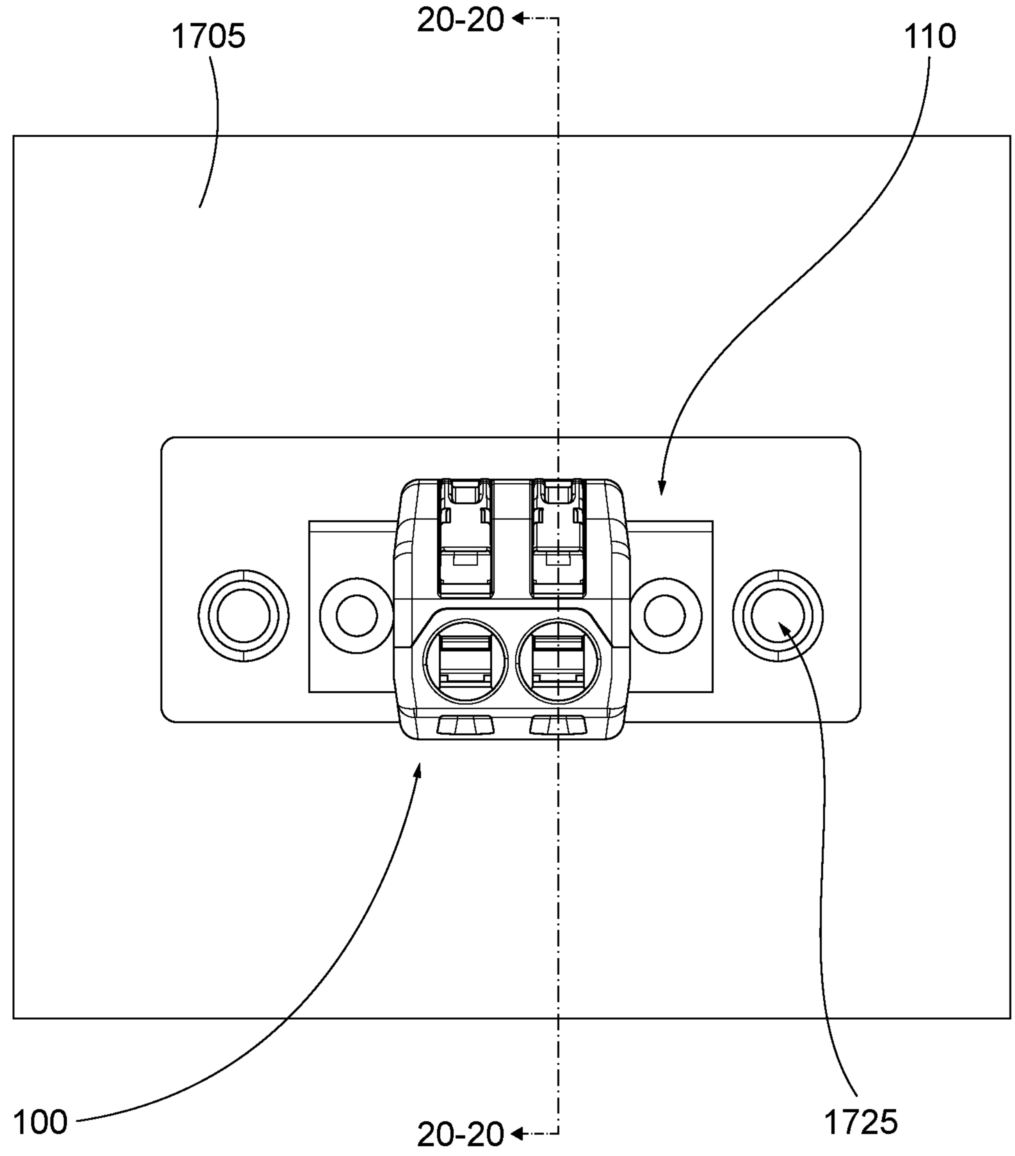
FIG. 19 is a front view of the FIG. 1 terminal block and outlet.
Figure 20:
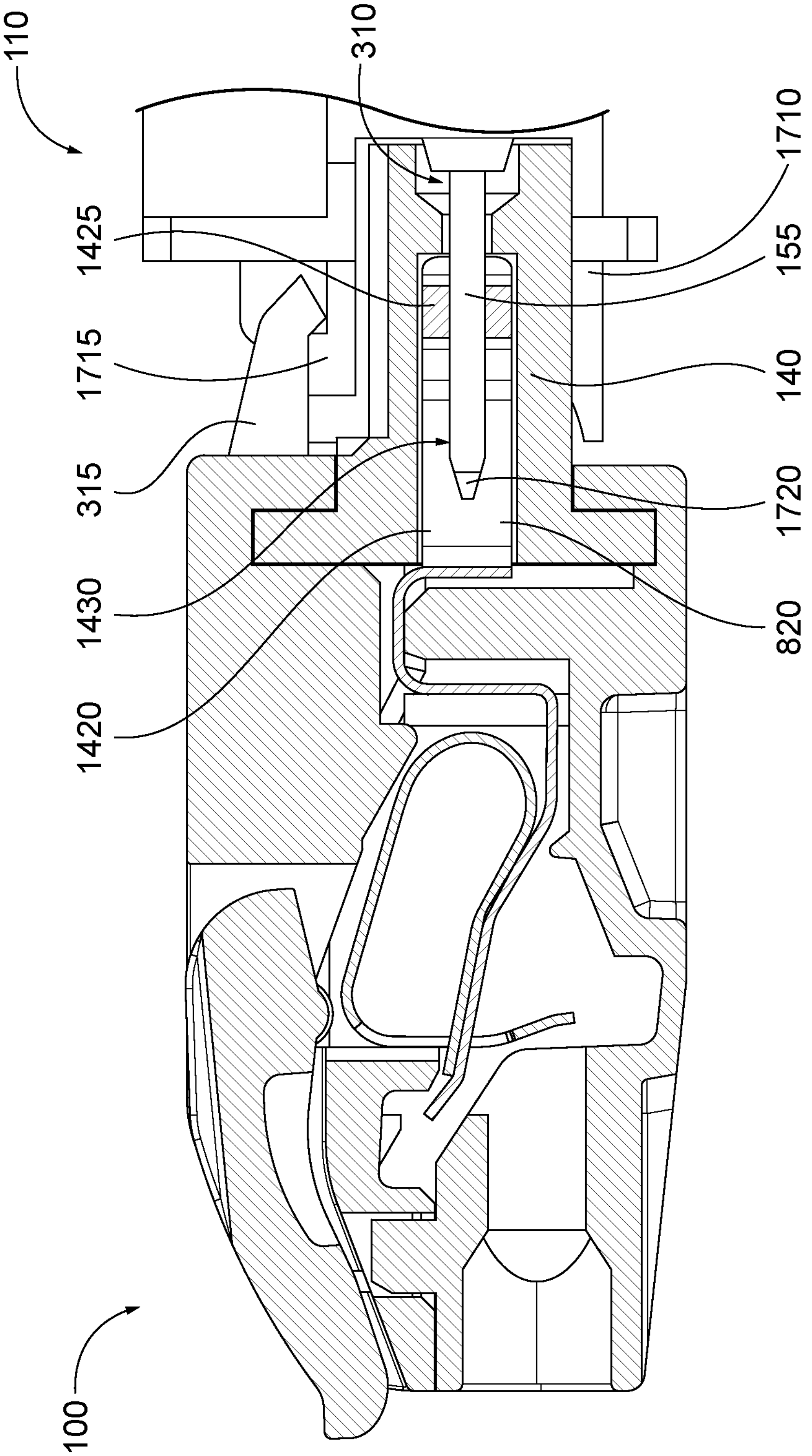
FIG. 20 is a cross-sectional view of the FIG. 1 terminal block and outlet as taken along line 20-20 in FIG. 19.

FIGS. 19 and 20 show the terminal block 100 coupled to the outlet 110. A user can insert the terminal block 100 into the outlet 110 to couple the terminal block 100 and outlet 110 without the need for tools. As shown, the plug 140 of the terminal block 100 is positioned within the plug receptacle 160 of the outlet 110 and the pin 155 of the outlet 110 are positioned within the plug 140. The outlet 110 is configured to support the terminal block 100 in an upright position when coupled. As shown, the clip 315 is positioned around the ridge 1715 such that the clip 315 and ridge 1715 couple together. The coupling of the clip 315 and the ridge 1715 contributes to the strength of the overall mechanical coupling between the terminal block 100 and outlet 110. To remove the terminal block 100 from the outlet 110, a user can lift the clip 315 away from the ridge 1715 and pull terminal block 100 out of the outlet 110. The terminal block 100 enables the user to easily connect and disconnect the terminal block 100 and outlet 110 without using additional tools.

Inside the plug 140, the pin 155 is positioned through the plug opening 310 and within the lip 1430. The socket 820 generally contacts the pin 155 at the arch 1425. In one embodiment, the pin 155 contacts other portions of the socket 820 when coupled, such as on the panel 1415, leaf 1420, and/or lip 1430. As noted previously, the arches 1425 are configured to compress the pin 155 between each other such as to secure the position of the pin 155 and to electrically connect to the pin 155. The secure mechanical connection between other components of the terminal block 100 and outlet 110 further ensures a reliable electrical connection between the socket 820 and pin 155. For example, positioning the plug 140 within the plug receptacle 160 and positioning the clip 315 around the ridge 1715 support the terminal block 100 to maintain the same position relative to the outlet 110. The terminal block 100 therefore enables a user to establish a reliable and strong electrical connection between the terminal block 100 and outlet 110 without needing tools.

Figure 21:
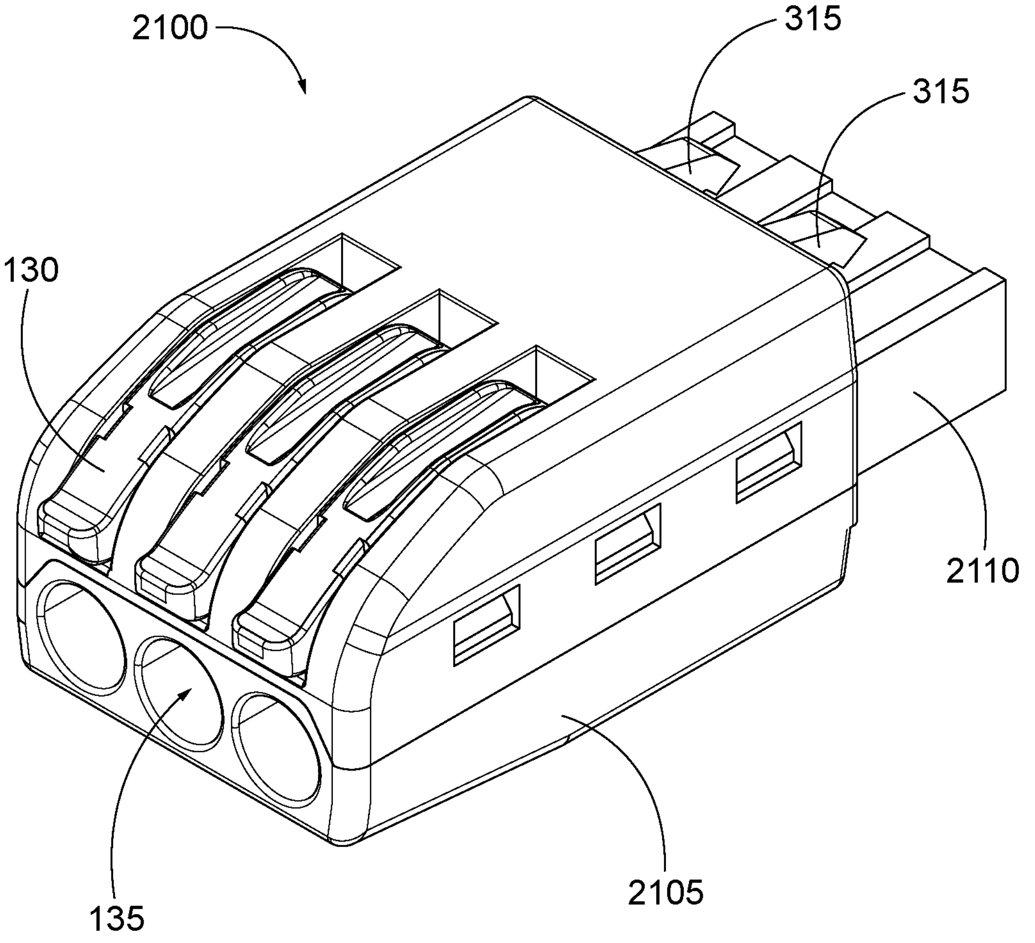
FIG. 21 is a perspective view of an alternate embodiment of the FIG. 1 terminal block.

Referring to FIG. 21, a terminal block 2100 is a variation of the terminal block 100 that is configured to connect to conductors on three conduction paths. The terminal block 2100 includes the same internal components and functions in the same way as the terminal block 100, but the number of components is different. The terminal block 2100 includes a body 2105 and a plug 2110. The body 2105 and plug 2110 are similar to the body 125 and plug 140 of the terminal block 100. However, the body 2105 and plug 2110 are shaped to enclose three busbars 805 and springs 810. On the interior, the terminal block 2100 includes two dividers 1405 such that one divider 1405 is positioned between every two busbars 805. As shown, the terminal block 2100 includes three levers 130 and three wire openings 135. The terminal block 2100 is configured to selectively couple three wires 105 within the wire openings 135 using the levers 130. Further, the terminal block 2100 includes two clips 315. The clips 315 are positioned towards opposite lateral sides of the terminal block 2100 to provide support to the terminal block 2100 when coupling to the outlet 110 or another outlet.

Figure 22:
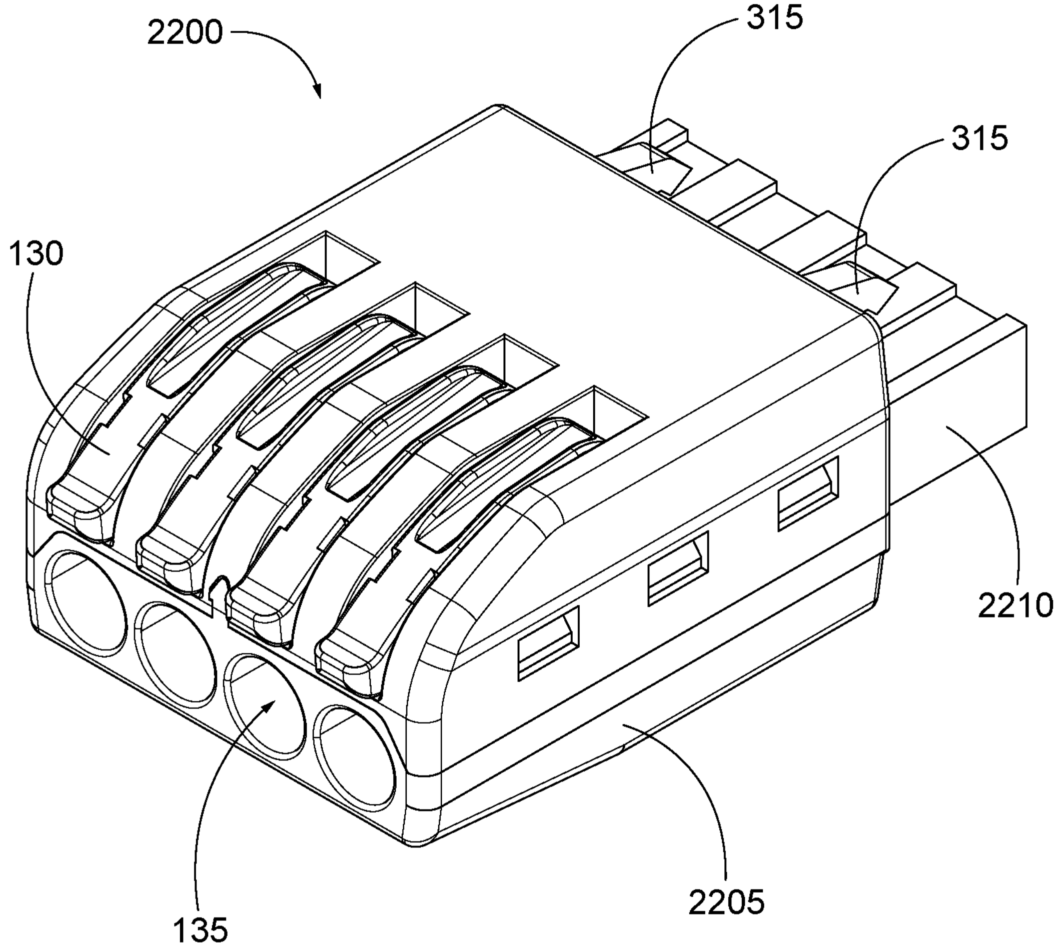
FIG. 22 is a perspective view of a second alternate embodiment of the FIG. 1 terminal block.

Referring to FIG. 22, a terminal block 2200 is another variation of the terminal block 100 that is configured to connect to conductors on four conduction paths. The terminal block 2200 includes the same internal components and functions in the same way as the terminal block 100, but the number of components is different. The terminal block 2200 includes a body 2205 and a plug 2210. The body 2205 and plug 2210 are similar to the body 125 and plug 140 of the terminal block 100 and to the body 2105 and plug 2110 in FIG. 21. However, the body 2105 and plug 2110 are shaped to enclose four busbars 805 and springs 810. On the interior, the terminal block 2200 includes three dividers 1405 such that one divider 1405 is positioned between every two busbars 805. As shown, the terminal block 2200 includes four levers 130 and four wire openings 135. The terminal block 2200 is configured to selectively couple four wires 105 within the wire openings 135 using the levers 130. Similar to the terminal block 2100 in FIG. 21, the terminal block 2200 includes two clips 315. As should be appreciated, the terminal block 2200 could include any number of clips 315 positioned around the plug 2210.

Figure 23:
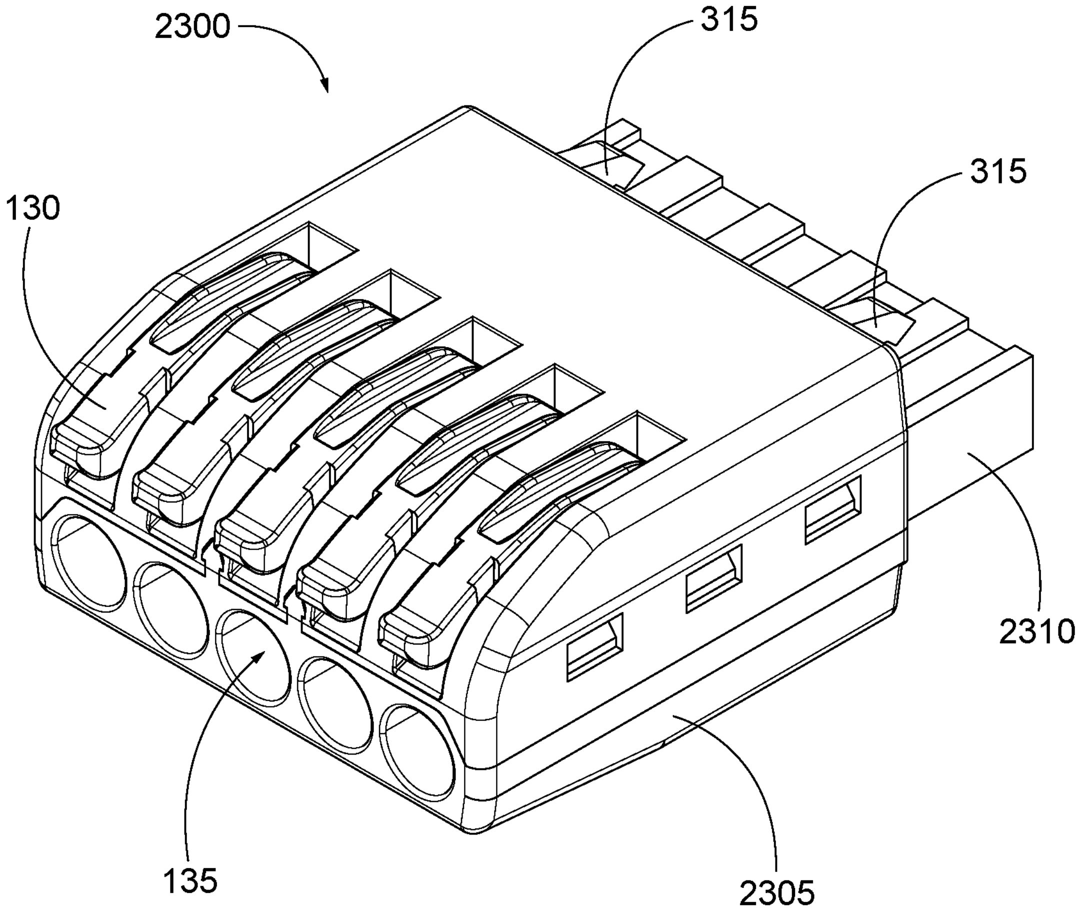
FIG. 23 is a perspective view of a third alternate embodiment of the FIG. 1 terminal block.

Referring to FIG. 23, a terminal block 2200 is another variation of the terminal block 100 that is configured to connect to conductors on five conduction paths. The terminal block 2300 includes the same internal components and functions in the same way as the terminal block 100, but the number of components is different. The terminal block 2300 includes a body 2305 and a plug 2310. The body 2305 and plug 2310 are similar to the body 125 and plug 140 of the terminal block 100 and to the body 2205 and plug 2210 in FIG. 22. However, the body 2305 and plug 2310 are shaped to enclose five busbars 805 and springs 810. On the interior, the terminal block 2300 includes four dividers 1405 such that one divider 1405 is positioned between every two busbars 805. As shown, the terminal block 2300 includes five levers 130 and five wire openings 135. The terminal block 2300 is configured to selectively couple five wires 105 within the wire openings 135 using the levers 130. Similar to the terminal block 2100 in FIG. 21 and terminal block 2200 in FIG. 22, the terminal block 2300 includes two clips 315. Again, the terminal block 2300 could include any number of clips 315.

Figure 24:
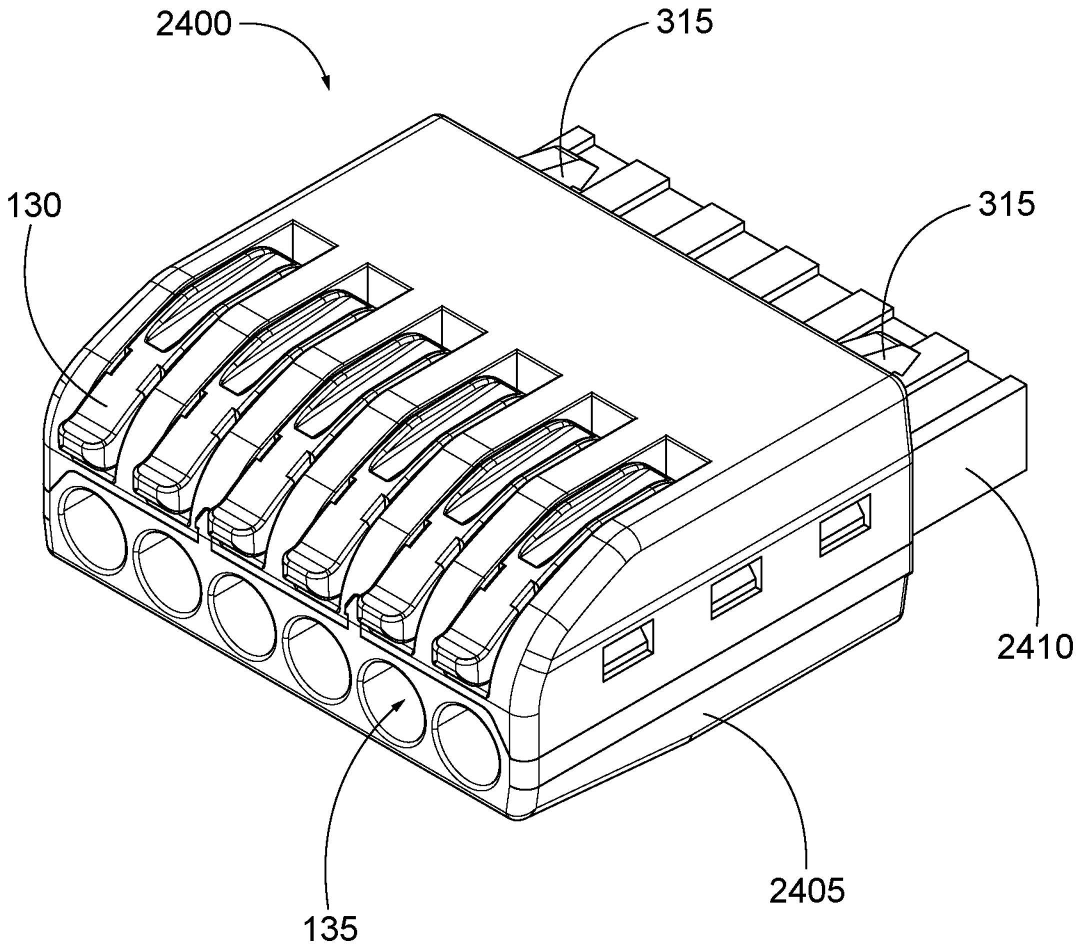
FIG. 24 is a perspective view of a fourth alternate embodiment of the FIG. 1 terminal block.

Referring to FIG. 24, a terminal block 2400 is another variation of the terminal block 100 that is configured to connect to conductors on six conduction paths. The terminal block 2400 includes the same internal components and functions in the same way as the terminal block 100, but the number of components is different. The terminal block 2400 includes a body 2405 and a plug 2410. The body 2405 and plug 2410 are similar to the body 125 and plug 140 of the terminal block 100 and to the body 2305 and plug 2310 in FIG. 23. However, the body 2405 and plug 2410 are shaped to enclose six busbars 805 and springs 810. On the interior, the terminal block 2400 includes five dividers 1405 such that one divider 1405 is positioned between every two busbars 805. As shown, the terminal block 2400 includes six levers 130 and six wire openings 135. The terminal block 2400 is configured to selectively couple six wires 105 within the wire openings 135 using the levers 130. As with the terminal block 2100, terminal block 2200, and terminal block 2300 in FIGS. 21-23, the terminal block 2400 includes two clips 315. As noted, the terminal block 2400 could include any number of clips 315.

As should be appreciated, the variations shown in FIGS. 21-24 are configured to couple to the wire 105 and the outlet 110 in the same way as the terminal block 100. Specifically, the terminal block 2100, terminal block 2200, terminal block 2300, and terminal block 2400 are each configured to couple to the wire 105 by positioning the wire 105 within the wire opening 135 and rotating the lever 130 into the closed position 705. Further, the terminal block 2100, terminal block 2200, terminal block 2300, and terminal block 2400 are each configured to couple to the pin 155 by positioning the pin 155 through the plug opening 310 and against the socket 820. However, the embodiment of the outlet 110 shown in FIGS. 1, 17, 18, and 19 is too small to receive the terminal block 2100, terminal block 2200, terminal block 2300, and terminal block 2400. As should be appreciated, the terminal block 2100, terminal block 2200, terminal block 2300, and/or terminal block 2400 could couple to other embodiments of the outlet 110 that correspond in size. In one example, the plug receptacle 160 of the outlet 110 is large enough to receive the terminal block 2400 such that any of the terminal block 100, terminal block 2100, terminal block 2200, terminal block 2300, and/or terminal block 2400 can couple to the outlet 110. In one example, the outlet 110 further includes six pins 155 in the plug receptacle 160 such that each socket 820 in the terminal block 100, terminal block 2100, terminal block 2200, terminal block 2300, and/or terminal block 2400 can couple to one pin 155. Additionally, other variations of the terminal block 100 could be shaped such as to include any number of conduction paths. For example, other variations of the terminal block 100 could include more than six busbars 805 and springs 810.

Figure 25:
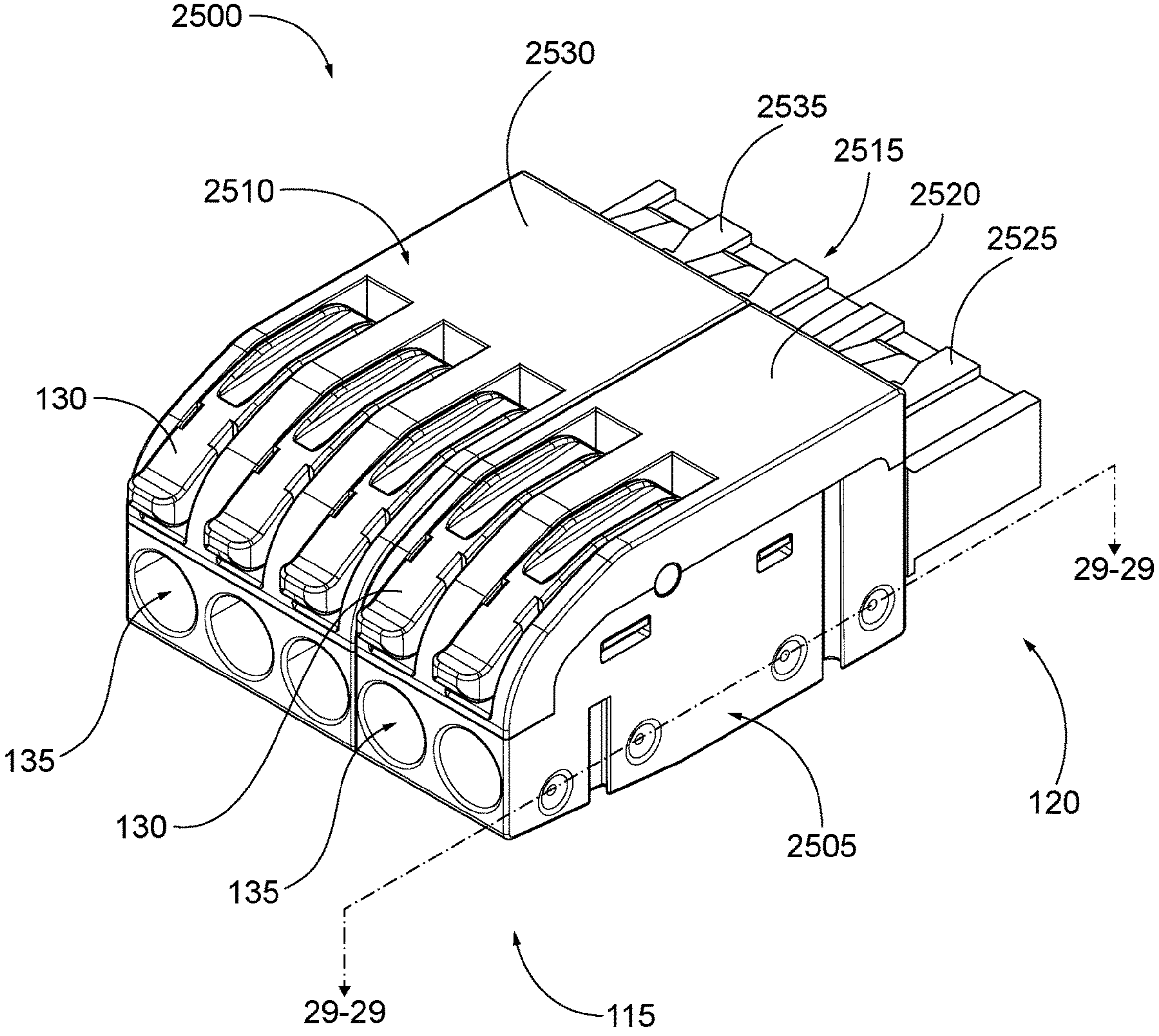
FIG. 25 is a perspective view of a terminal block assembly including alternate embodiments of the FIG. 1 terminal block.

FIG. 25 depicts a terminal block assembly 2500 that includes one or more variations of the terminal block 100. In the illustrated example, the terminal block assembly 2500 includes a first terminal block 2505 and a second terminal block 2510 that are both variations of the FIG. 1 terminal block 100. The first terminal block 2505 is similar to the FIG. 1 terminal block 100 and configured to couple to the same number of wires 105 and to outlet 110 in the same way as the FIG. 1 terminal block 100. The second terminal block 2510 is similar to the terminal block 2100 in FIG. 21 terminal block 2100 and is configured to couple to the same number of wires 105 and to one embodiment the outlet 110 in the same way as the FIG. 21 terminal block 2100. However, the first terminal block 2505 and second terminal block 2510 are configured to couple together. For example, the first terminal block 2505 and second terminal block 2510 are configured to couple through a dovetail joint. By coupling multiple blocks together, a user can form a variation of the FIG. 1 terminal block 100 that supports a customized number of conduction paths. In the illustrated example, the first terminal block 2505 and second terminal block 2510 are coupled to form the terminal block assembly 2500 that supports five conduction paths. The terminal block assembly 2500 includes a plug 2515 that is configured to couple to one embodiment of the outlet 110. The plug 2515 is similar to the plug 2310 of the terminal block 2300 in FIG. 23 and is configured to receive the same number of pins 155 as the FIG. 23 plug 2310 when coupling to one embodiment of the outlet 110. As should be appreciated, the terminal block assembly 2500 can include more than two terminal blocks and/or can be configured to support any number of conduction paths.

As shown, the first terminal block 2505 includes a body 2520 and a plug 2525. The body 2520 is similar to the body 125 of the FIG. 1 terminal block 100 and the plug 2525 is similar to the plug 140 of the FIG. 1 terminal block 100. In the illustrated example, the body 2520 and plug 2525 are configured to enclose two busbars 805 and springs 810 such as to support two conduction paths. Similarly, the second terminal block 2510 includes a body 2530 and a plug 2535. The body 2530 is similar to the body 2105 of the terminal block 2100 and the plug 2535 is similar to the plug 2110 of the terminal block 2100 shown in FIG. 21. In the illustrated example, the body 2530 and plug 2535 are configured to enclose three busbars 805 and springs 810 such as to support three conduction paths. Both the first terminal block 2505 and second terminal block 2510 are configured to couple to the wires 105 in the same way as the FIG. 1 terminal block 100. As shown, the first terminal block 2505 and second terminal block 2510 include levers 130 that are operable in the same way as in the FIG. 1 terminal block 100, and both the first terminal block 2505 and second terminal block 2510 define wire openings 135 that are configured to receive the wire 105. As should be appreciated, other embodiments of the first terminal block 2505 and/or second terminal block 2510 could be configured to support a different number of conduction paths.

Figure 26:
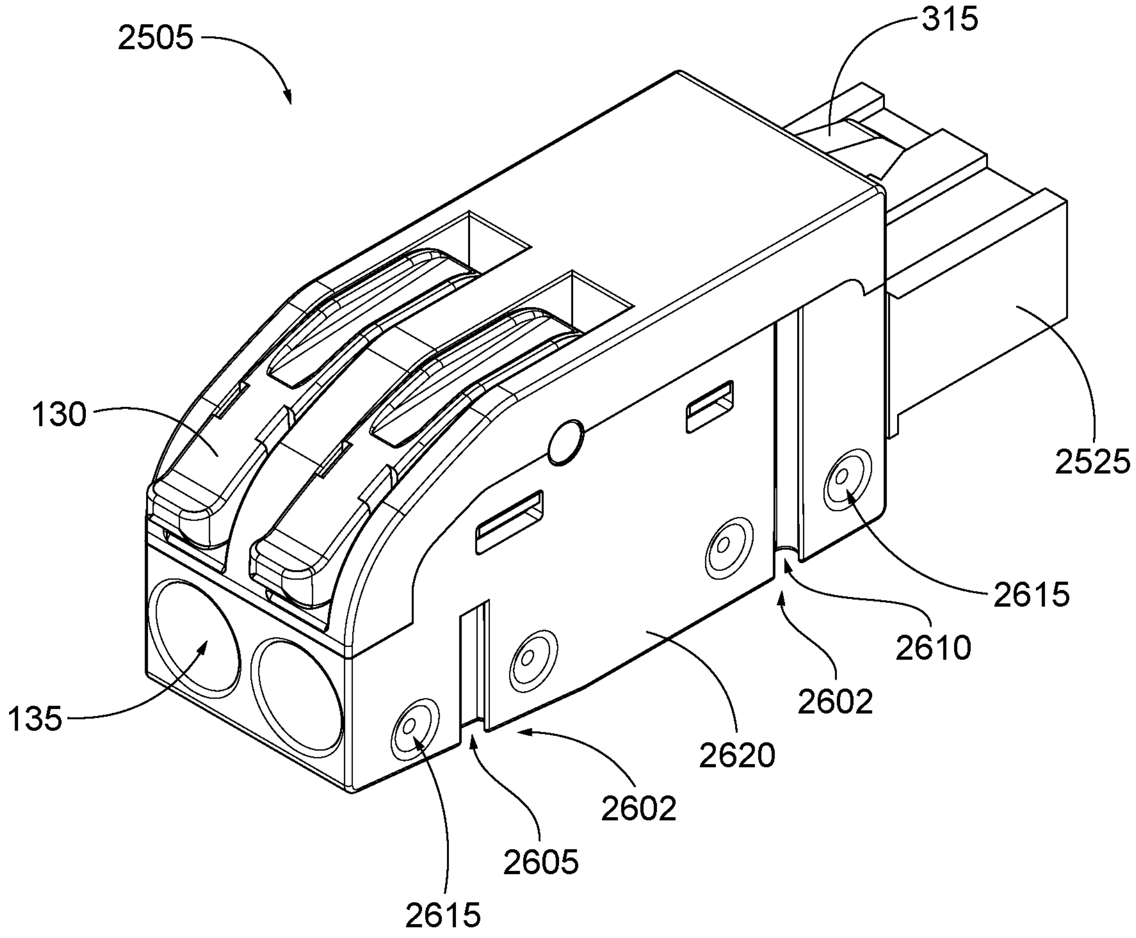
FIG. 26 is a perspective view of a first terminal block from the FIG. 25 terminal block assembly on a wire side.
Figure 27:
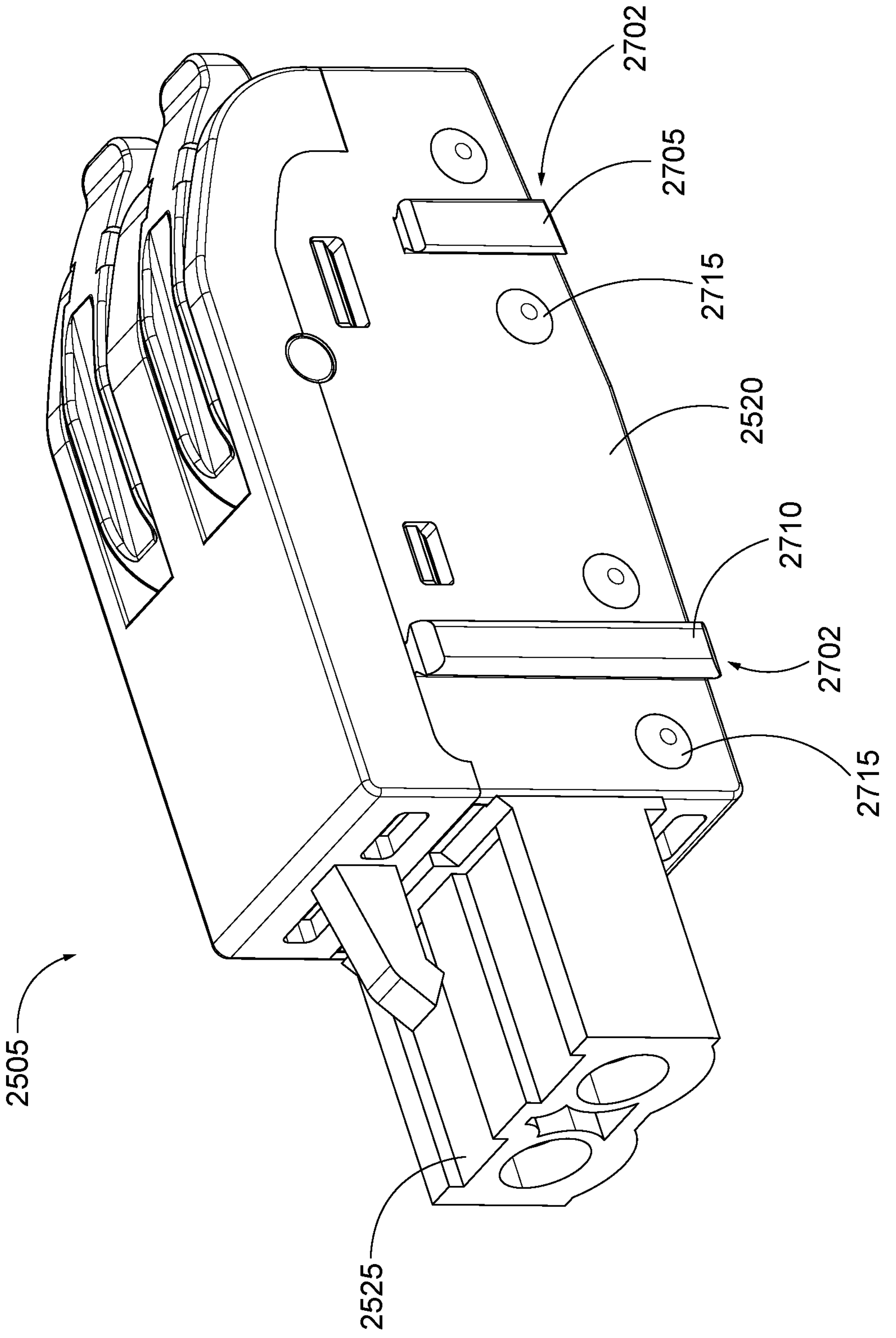
FIG. 27 is a perspective view of a first terminal block from the FIG. 25 terminal block assembly on an outlet side.

Referring to FIGS. 26 and 27, the first terminal block 2505 defines one or more slots 2602. In the illustrated example, the first terminal block 2505 defines a first slot 2605 and a second slot 2610. The first slot 2605 is positioned on the body 2520 towards the wire side 115 and the second slot 2610 is positioned on the body 2520 towards the outlet side 120. Both the first slot 2605 and the second slot 2610 extend partially into the body 2520 and through a bottom side of the first terminal block 2505. In the illustrated example, the second slot 2610 extends further away from the bottom side than the first slot 2605. Further, the first terminal block 2505 defines one or more divots 2615. In the illustrated example, the divots 2615 are arranged such that one divot 2615 is positioned on each side of each slot 2602.

As shown in FIG. 27, the first terminal block 2505 further includes one or more ribs 2702 that extend from the body 2520. The first terminal block 2505 is configured to couple to the second terminal block 2510 and/or another terminal block using the ribs 2702 and the slots 2602. The slots 2602 are configured to receive the ribs 2702 such as to limit or prevent movement of the first terminal block 2505 relative to the other terminal block. The ribs 2702 and slots 2602 form a dovetail joint to couple the first terminal block 2505 and second terminal block 2510. In the illustrated example, the first terminal block 2505 includes a first rib 2705 and a second rib 2710. Distal portions of the first rib 2705 and the second rib 2710 that are positioned away from the body 2520 in a lateral direction are shaped wider than proximal portions of the first rib 2705 and second rib 2710. Through this shape, the ribs 2702 are configured to prevent the first terminal block 2505 from moving away from the second terminal block 2510 in a lateral direction and to prevent movement of the first terminal block 2505 relative to the second terminal block 2510 from the wire side 115 to the outlet side 120. The shape of the ribs 2702 is generally consistent between the top and bottom sides such as to allow the ribs 2702 to slide within the slots 2602. Through this shape, the slots 2602 and ribs 2702 form a sliding dovetail joint when the first terminal block 2505 and second terminal block 2510 are coupled. As shown, the positioning and shapes of the first rib 2705 and the second rib 2710 correspond to the positioning and shapes of the first slot 2605 and second slot 2610. The slots 2602 and the ribs 2702 are aligned such that the first terminal block 2505 and second terminal block 2510 form the terminal block assembly 2500 in a generally consistent shape when coupling. For example, the ribs 2702 and slots 2602 are positioned such that the plug 2525 on the first terminal block 2505 and the plug 2535 on the second terminal block 2510 are aligned when the first terminal block 2505 and second terminal block 2510 are coupled and such that the plug 2515 of the terminal block assembly 2500 is shaped to be received by one embodiment of the outlet 110.

The first terminal block 2505 further includes studs 2715. The studs 2715 extend from the body 2520 and are positioned to correspond to the positions of the divots 2615. The divots 2615 are configured to receive the studs 2715 when the first terminal block 2505 is coupled to another terminal block. The divots 2615 and studs 2715 further support the first terminal block 2505 and second terminal block 2510 to maintain the same position when coupled. Particularly, the divots 2615 and studs 2715 are configured to impede or prevent the first terminal block 2505 from sliding relative to the second terminal block 2510 in a direction that the slots 2602 and ribs 2702 are oriented. In this way, the divots 2615 and studs 2715 impede or prevent the ribs 2702 from sliding out of the slots 2602 and therefore impede the first terminal block 2505 against decoupling from the second terminal block 2510.

Figure 28:
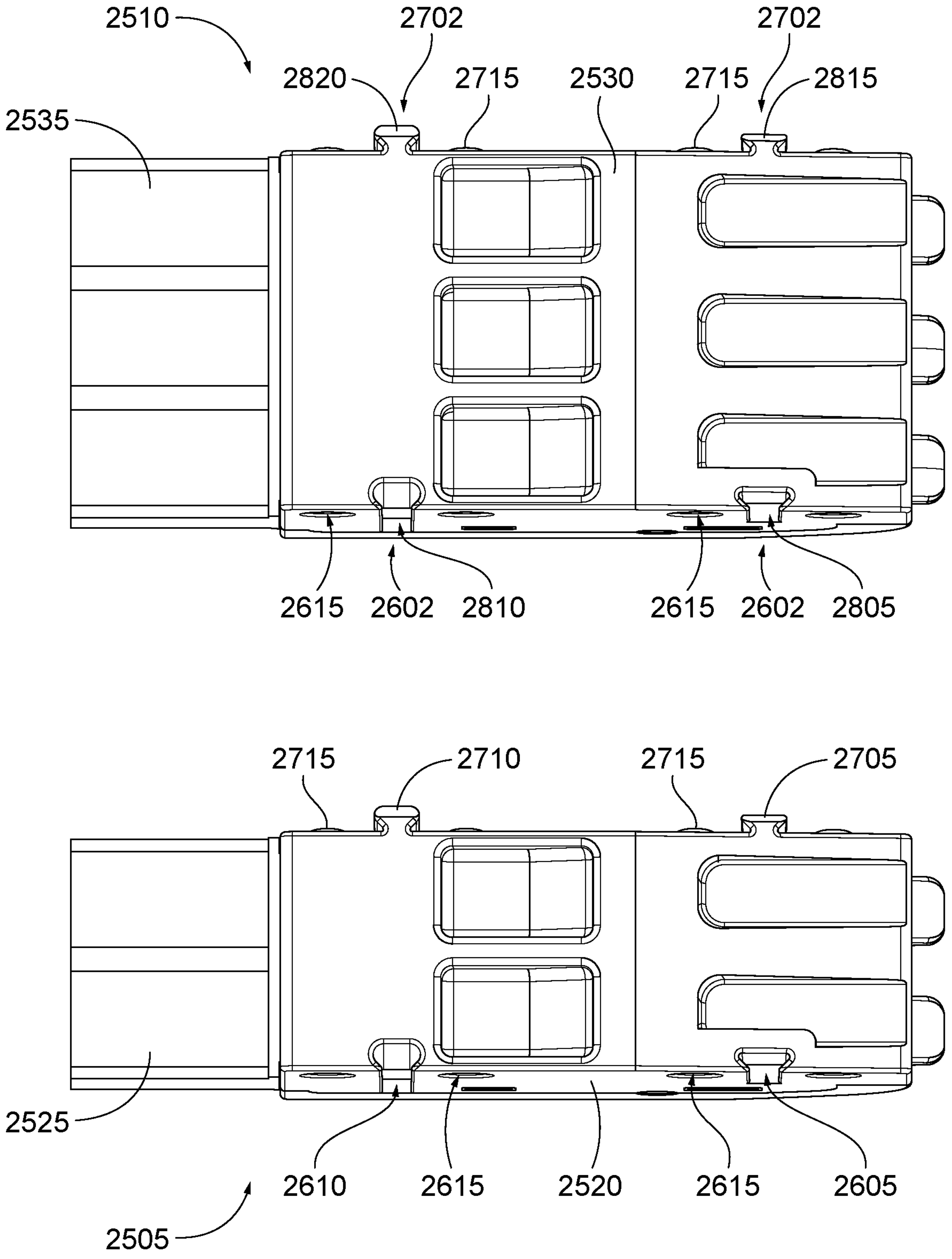
FIG. 28 is a bottom perspective view of the first terminal block and the second terminal block from the FIG. 25 terminal block assembly.
Figure 29:
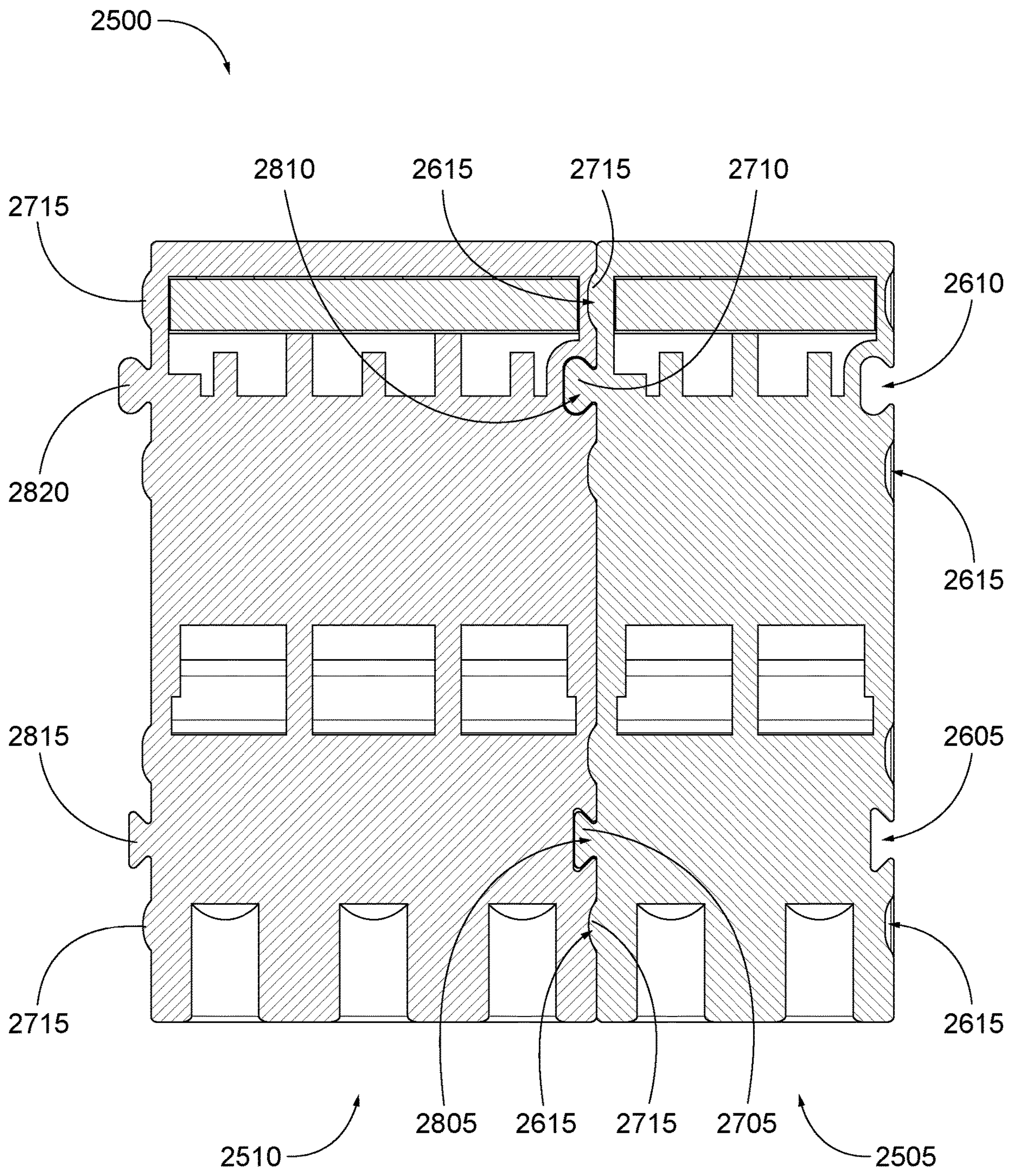
FIG. 29 is a cross-sectional view of the FIG. 25 terminal block assembly as taken along line 29-29 in FIG. 25.

Referring to FIGS. 28 and 29, the second terminal block 2510 similarly includes slots 2602, divots 2615, ribs 2702, and studs 2715. The number of slots 2602, divots 2615, ribs 2702, and studs 2715 on the second terminal block 2510 are generally the same as the number of such features on the first terminal block 2505. By using consistent numbers of slots 2602, divots 2615, ribs 2702, and studs 2715 among the first terminal block 2505, second terminal block 2510, and/or other terminal blocks, any number of various terminal blocks can be coupled together to form the terminal block assembly 2500. Similar to the first terminal block 2505, the second terminal block 2510 includes a first slot 2805 and a second slot 2810. The first slot 2805 and second slot 2810 on the second terminal block 2510 are aligned with the first rib 2705 and second rib 2710 on the first terminal block 2505. As shown in FIG. 29, the first rib 2705 of the first terminal block 2505 is positioned within the first slot 2805 of the second terminal block 2510 and the second rib 2710 of the first terminal block 2505 is positioned within the second slot 2810 of the second terminal block 2510 when the first terminal block 2505 and second terminal block 2510 are coupled. Similarly, the studs 2715 of the first terminal block 2505 are positioned within the divots 2615 of the second terminal block 2510. In the illustrated example, the slots 2602 and divots 2615 are all positioned on one side and the ribs 2702 and studs 2715 are all positioned on another side on both the first terminal block 2505 and the second terminal block 2510. In one example case, a user slides the first terminal block 2505 along the second terminal block 2510 from a bottom side such that the first rib 2705 of the first terminal block 2505 slides within the first slot 2805 of the second terminal block 2510 and the second rib 2710 of the first terminal block 2505 slides within the second slot 2810 of the second terminal block 2510. As the user slides the first terminal block 2505 against the second terminal block 2510, the studs 2715 of the first terminal block 2505 snap into the divots 2615 of the second terminal block 2510 such as to prevent the first terminal block 2505 from sliding out of the second terminal block 2510 and to complete the coupling between the first terminal block 2505 and second terminal block 2510. The user can then decouple the first terminal block 2505 and second terminal block 2510 by applying a force such that the studs 2715 of the first terminal block 2505 snap out of the divots 2615 of the second terminal block 2510 and the ribs 2702 of the first terminal block 2505 are free to slide out of the slots 2602 of the second terminal block 2510.

In addition to the first slot 2805 and second slot 2810, the second terminal block 2510 further includes a first rib 2815 and a second rib 2820. As should be appreciated, the first terminal block 2505 and second terminal block 2510 can be coupled such that the first rib 2815 of the second terminal block 2510 is positioned within the first slot 2605 of the first terminal block 2505 and the second rib 2820 of the second terminal block 2510 is positioned within the second slot 2610 of the first terminal block 2505. Further, the first rib 2815 and second rib 2820 allow the second terminal block 2510 to couple to another pluggable terminal block while coupled to the first terminal block 2505. In an alternate embodiment, the first terminal block 2505 is coupled to the second terminal block 2510 through the ribs 2702 of the first terminal block 2505 and the slots 2602 of the second terminal block 2510, and the second terminal block 2510 is coupled to another pluggable terminal block through the ribs 2702 of the second terminal block 2510 and the slots 2602 of the other terminal block. In yet another alternate embodiment, one side of the first terminal block 2505 and/or second terminal block 2510 does not include slots 2602 and/or ribs 2702, and the first terminal block 2505 and/or second terminal block 2510 are not configured to couple to a terminal block on those sides. As should be appreciated, either side of the first terminal block 2505 and second terminal block 2510 can include one or more slots 2602, divots 2615, ribs 2702, and/or studs 2715. For example, the first terminal block 2505 can include one slot 2602 and one rib 2702 that couple to a corresponding rib 2702 and slot 2602 on one side of the second terminal block 2510. As should further be appreciated, the first terminal block 2505 and second terminal block 2510 can include a different number of slots 2602 and ribs 2702 and/or a different number of divots 2615 and studs 2715 than in the illustrated example.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"American Wire Gauge (AWG)" generally refers to a logarithmic stepped standardized wire gauge system referring to the diameters of round, solid, nonferrous, electrically conducting wire. Dimensions of the wires are given in ASTM standard B258. Increasing gauge numbers denote decreasing wire diameters. The AWG tables are for a single, solid, round conductor. The AWG of a stranded wire is determined by the cross-sectional area of the equivalent solid conductor. Because there are also small gaps between the strands, a stranded wire generally has a slightly larger overall diameter than a solid wire with the same AWG.

"And/Or" generally refers to a grammatical conjunction indicating that one or more of the cases it connects may occur. For instance, it can indicate that either or both of the two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Cantilever Spring" generally refers to a spring fixed only at one end. In one non-limiting example, the cantilever spring is in the form of a flat spring that is anchored at one and the other end extends freely away from the anchored end.

"Cavity" generally refers to an empty space in a solid object. The cavity can be completely or partially surrounded by the solid object. For example, the cavity can be open to the surrounding environment.

"Channel" generally refers to a long, narrow groove in a surface of an object.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Contact" generally refers to a condition and/or state where at least two objects are physically touching. For example, contact requires at least one location where objects are directly or indirectly touching, with or without any other member(s) material in between.

"Dovetail Joint" generally refers to a mechanical connection between two objects that utilizes a pin protruding from one object and a slot defined by the other object. The pin can be shaped in many forms. For example, the pins can be shaped like a stud, rail, or rib, to name just a few examples. In some cases, a dovetail joint includes multiple pins and slots. Typically, but not always, the pins have trapezoid shape such that the wider portion of the pin is positioned further into the slot. The slot generally extends through at least one side of the object such as to allow the pin of the other object to slide into the slot through the open side. In some cases, the pin and slot are shaped such that as to stop one object from sliding relative the other object at a certain point in one direction. In one example, a dovetail joint includes additional structures to secure the connection between the two objects. For example, to maintain the relative positions of the joined objects, a dovetail joint can further utilize adhesive between the objects, a stud on one object that pops into a divot on another object, and/or a wedge inserted into the joint to name a few examples.

"Electrical Connection" generally refers a connection between two objects that allows a flow of electric current and/or electric signals.

"Euroblock" or "Phoenix Connector" generally refers to a type of extra-low voltage disconnectable or pluggable terminal block. "Euroblock" is short for "European-style terminal block." The Euroblock is sometimes referred to as a "Phoenix Connector" which refers to a manufacturer of a brand of Euroblocks, Phoenix Contact, though other companies manufacture Euroblocks. Phoenix Contact sells Euroblock type terminals under the brand COMBICON®. The Euroblock is a solderless connector that clamps to wires and is able to be plugged into a matching socket in an electronic device. Euroblocks are for example commonly used for microphone signals, line level-audio signals, and control signals.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Female" generally refers to a structure that connects to another structure that includes hollow portions for receiving portions of a corresponding male connector.

"Frame" generally refers to a structure that forms part of an object and gives strength and/or shape to the object.

"Gap" generally refers to a space between objects, surfaces, or points.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Leaf Spring" generally refers to a type of spring made from one or more strips of elastic material. In one form, multiple strips of elastic material are laminated together to form the leaf spring, and in other forms, a single strip of elastic material, such metal and/or plastic, forms the leaf spring. The leaf springs can be curved or substantially straight. The leaf spring can further include a frame to which the ends of the strips are attached.

"Lever" generally refers to a simple machine including a beam, rod, or other structure pivoted at a fulcrum, such as a hinge. In one form, the lever is a rigid body capable of rotating on a point on itself. Levers can be generally categorized into three types of classes based on the location of fulcrum, load, and/or effort. In a class 1 type of lever, the fulcrum is located in the middle such that the effort is applied on one side of the fulcrum and the resistance or load on the other side. For class 1 type levers, the mechanical advantage may be greater than, less than, or equal to 1. Some non-limiting examples of class 1 type levers include seesaws, crowbars, and a pair of scissors. In a class 2 type of lever, which is sometimes referred to as a force multiplier lever, the resistance or load is located generally near the middle of the lever such that the effort is applied on one side of the resistance and the fulcrum is located on the other side. For class 2 type levers, the load arm is smaller than the effort arm, and the mechanical advantage is typically greater than 1. Some non-limiting examples of class 2 type levers include wheelbarrows, nutcrackers, bottle openers, and automobile brake pedals. In a class 3 type lever, which is sometimes referred to as a speed multiplier lever, the effort is generally located near the middle of the lever such that the resistance or load is on one side of the effort and the fulcrum is located on the other side. For class 3 type levers, the effort arm is smaller than the load arm, and the mechanical advantage is typically less than 1. Some non-limiting examples of class 3 type levers include a pair of tweezers and the human mandible.

"Male" generally refers to a structure that connects to another structure that includes portions that fill or fit inside the hollow portion of a corresponding female connector.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Opening" generally refers to a space or hole that something can pass through.

"Pin" or "Peg" generally refers to an elongated piece of material such as wood, metal, plastic and/or other material. Typically (but not always), the pin is tapered at one or both ends, but the pin can be shaped differently in other examples. For example, the ends of the pin can be flattened, widened, and/or bent in order to retain the pin. Pins can be used for any number of purposes. For example, the pin can be used in machines to couple components together or otherwise act as an interface between components. Pins can also be used for holding things together, hanging things on, and/or marking a position. Normally, but not always, the pin is a small, usually cylindrical piece. In certain cases, the pin is pointed and/or a tapered piece used to pin down, fasten things together, and/or designed to fit into holes. In other examples, the pin can have a polyhedral shape, such as with a rectangular or triangular cross-sectional shape, or an irregular shape.

"Plastic" generally refers to a group of materials, either synthetic, semi-synthetic, and/or naturally occurring, that may be shaped when soft and then hardened to retain the given shape. Plastics are polymers. A polymer is a substance made of many repeating units. Plastics are generally insulators.

"Polymer" generally refers to a material characterized by a molecular structure formed from the repetition of subunits bonded together. Examples include, but are not limited to, plastics or rubber.

"Socket" generally refers a device into which something fits in order to electrically and/or physically connect another electrical device to a circuit.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic. The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Terminal" generally refers to a plug, socket or other connection (male, female, mixed, hermaphroditic, or otherwise) for mechanically and electrically connecting two or more wires or other conductors.

"Terminal Block" or "Connection Terminal" generally refers to a modular device that includes an insulated frame or housing that electrically connects and secures two or more electrically conductive devices or parts together such as wires. In one form, the terminal block includes a clamping component, such as for clamping to wires, and a conducting strip that electrically connects wires or other parts together. The clamping component and conducting strip are typically housed in the insulative housing. There are various types of terminal blocks including, but not limited to, single level pass-through terminal blocks, dual level terminal blocks, three level terminal blocks, pluggable type terminal blocks (e.g., Euroblocks), ground terminal blocks, fused connection terminal blocks, thermocouple terminal blocks, and switch type terminal blocks.

"Toolless" generally refers to an activity not having and/or requiring tools in order to perform the activity. Typically, the act can be performed manually by an individual.

"Wall" means here is structure that forms a solid surface. It may be a portion of a house, room, or otherwise. A wall may be planar or multiplanar and may be constructed of any of a variety of materials, including, but not limited to metal, concrete, wood, or plastic.

"Wire" generally refers to elongated electrically conductive metal. This includes an individual strand, multiple strands (twisted, braided and/or not), traces, strips and other cross-sectional geometries. In some examples, wire is uninsulated wire, such as bare wire without a coating and/or plating. In other examples, wire is insulated wire with a coating of non-conductive material surrounding the wire. In some examples, insulated wire is coated with plastic, fluoropolymer, and/or rubber materials.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 terminal block
105 wire
110 outlet
115 wire side
120 outlet side
125 body
130 lever
135 wire opening
140 plug
145 conductive portion
150 insulated portion
155 pin
160 plug receptacle
205 channel
310 plug opening
315 clip
705 closed position
805 busbar
810 spring
815 strut
820 socket
825 intermediate portion
830 base
835 fulcrum
840 resting position
845 arm
850 bend
855 leg
860 cavity
905 aperture
910 edge
915 gap
1005 open position
1105 compressed position
1110 lobe
1115 tongue
1405 divider
1407 spacer
1410 sidewall
1412 socket opening
1415 panel
1420 leaf
1425 arch
1430 lip
1435 pin opening
1440 mouth
1505 guide
1510 flange
1705 wall
1710 frame
1715 ridge
1720 tip
1725 fastener opening
2100 terminal block
2105 body
2110 plug
2200 terminal block
2205 body
2210 plug
2300 terminal block
2305 body
2310 plug
2400 terminal block
2405 body
2410 plug
2500 terminal block assembly
2505 first terminal block
2510 second terminal block
2515 plug
2520 body
2525 plug
2530 body
2535 plug
2602 slot
2605 first slot
2610 second slot
2615 divots
2702 rib
2705 first rib
2710 second rib
2715 studs
2805 first slot
2810 second slot
2815 first rib
2820 second rib

The invention claimed is:

1. A system, comprising:
a terminal block including
a plug defining an opening configured to receive a pin, wherein the plug has a socket configured to electrically couple to the pin,
a busbar electrically connected to the socket,
a spring having a base resting against the busbar,
wherein the spring has an arm with a leg that extends past the busbar and a fulcrum connecting the base to the arm,
wherein the leg of the spring has an edge positioned on a side of the busbar that is opposite to where the base of the spring rests against the busbar,
wherein the edge and the busbar define a gap,
wherein the spring has a resting position and a compressed position,
a lever configured to pivot to compress the spring to the compressed position,
wherein the gap between the edge and the busbar becomes larger when the spring moves from the resting position to the compressed position,
wherein the gap between the edge and the busbar is sized to receive a wire when the spring is in the compressed position,
wherein the spring is biased to the resting position, and
wherein the edge of the spring at the resting position is configured to press the wire against the busbar to electrically connect the wire to the pin.

2. The system of claim 1, wherein the terminal block is in a form of a Euroblock.

3. The system of claim 1, further comprising:
an outlet defining a plug receptacle housing the pin; and
wherein the plug of the terminal block is received in the plug receptacle.

4. The system of claim 3, wherein:

the terminal block has a clip;

the outlet has a ridge; and the clip of the terminal block is clipped to the ridge of the outlet.

5. The system of claim 1, wherein:

the lever is configured to pivot between a closed position and an open position;

the lever at the open position compresses the spring to the compressed position; and the lever at the closed position disengages from the spring to return the spring to the resting position.

6. The system of claim 5, wherein:

the terminal block includes a body defining a channel;

the lever is configured to rest within the channel to prevent accidental rotation of the lever;

the lever is positioned within the channel when in the closed position; and the lever extends outside of the channel when in the open position.

7. The system of claim 1, wherein the socket includes at least two leaves oriented in an opposing manner to define a pin opening where the pin is received in the socket.

8. The system of claim 7, wherein:

the leaves curve toward each other to form arches; and the arches of the leaves press against the pin when received in the socket.

9. The system of claim 8, wherein:

the arches curve away from each other to form lips; and the lips define a mouth that is configured to receive the pin.

10. The system of claim 1, wherein the terminal block has a body with a member configured to couple the terminal block to another terminal block.

11. The system of claim 10, wherein the member includes a stud.

12. The system of claim 10, wherein the member includes a rib.

13. The system of claim 12, wherein the rib forms a dovetail joint with a slot in the other terminal block.

14. A terminal block, comprising:

a plug defining an opening configured to receive a pin;

wherein the plug has a socket configured to electrically couple to the pin;

wherein the socket includes at least two leaves oriented in an opposing manner to define a pin opening where the pin is received in the socket;

wherein the leaves curve toward each other to form arches;

wherein the arches of the leaves press against the pin when received in the socket;

a busbar being configured to provide an electrical connection between a wire and the pin;

a spring configured to selectively couple the wire to the busbar; and a lever configured to pivot to actuate the spring.

15. The terminal block of claim 14, wherein:

the arches curve away from each other to form lips; and the lips define a mouth that is configured to receive the pin.

16. The terminal block of claim 14, wherein:

the spring has a base resting against the busbar;

the spring has an arm with a leg that extends past the busbar and a fulcrum connecting the base to the arm;

the leg of the spring has an edge positioned on a side of the busbar that is opposite to where the base of the spring rests against the busbar;

the edge and the busbar define a gap;

the spring has a resting position and a compressed position;

the lever is configured to pivot to compress the spring to the compressed position;

the gap between the edge and the busbar becomes larger when the spring moves from the resting position to the compressed position;

the gap between the edge and the busbar is sized to receive a wire when the spring is in the compressed position;

the spring is biased to the resting position; and the edge of the spring at the resting position is configured to press the wire against the busbar to electrically connect the wire to the pin.

17. The terminal block of claim 14, wherein:

the terminal block has a body with a member configured to couple the terminal block to another terminal block;

the member includes a rib; and the rib forms a dovetail joint with a slot in the other terminal block.

18. A system, comprising:

a first terminal block including a first body, a first plug with a first socket, a first busbar electrically connected to the first socket, and a first spring configured to couple a first wire to the first busbar;

wherein the first terminal block includes a first lever pivotally coupled to the first body to actuate the first spring;

a second terminal block including a second body, a second plug with a second socket, a second busbar electrically connected to the second socket, and a second spring configured to couple a second wire to the second busbar;

wherein the second terminal block includes a second lever pivotally coupled to the second body to actuate the second spring;

wherein the first body has a member;

wherein the second body defines a cavity; and wherein the first terminal block and the second terminal block is coupled together via the member being received in the cavity.

19. The system of claim 18, wherein:

the member includes a rib; and the cavity includes a slot.

20. The system of claim 19, wherein:

the rib and the slot form a dovetail joint between the first terminal block and the second terminal block;

the first body has a stud;

the second body defines a divot; and the stud is received in the divot to impede the first terminal block from sliding relative to the second terminal block.

* * * * *